(12) United States Patent
Guth

(10) Patent No.: US 12,151,294 B2
(45) Date of Patent: Nov. 26, 2024

(54) BENCHTOP CIRCULAR SAW APPARATUS WITH INTEGRATED MULTISTAGE FILTRATION SYSTEM

(71) Applicant: JPL GLOBAL, LLC, Moreno Valley, CA (US)

(72) Inventor: Paul W. Guth, Menifee, CA (US)

(73) Assignee: JPL Global, LLC, Perris, CA (US)

( * ) Notice: Subject to any disclaimer, the term of this patent is extended or adjusted under 35 U.S.C. 154(b) by 0 days.

(21) Appl. No.: 17/161,651

(22) Filed: Jan. 28, 2021

(65) Prior Publication Data

US 2021/0229196 A1 Jul. 29, 2021

Related U.S. Application Data

(60) Provisional application No. 62/967,007, filed on Jan. 28, 2020.

(51) Int. Cl.
| | | |
|---|---|---|
| *B23D 47/02* | (2006.01) | |
| *B27B 5/29* | (2006.01) | |
| *B27G 19/02* | (2006.01) | |

(52) U.S. Cl.
CPC .............. *B23D 47/025* (2013.01); *B27B 5/29* (2013.01); *B27G 19/02* (2013.01)

(58) Field of Classification Search
CPC ........ B23D 47/025; B27B 5/29; B27G 19/02; Y10T 83/7697
USPC ......... 83/438, 477.2, 447, 449, 450, 435.27, 83/468.3, 581, 435.12, 435.14, 462, 83/522.25; 144/286.1, 287; 125/13.01; 269/318
See application file for complete search history.

(56) References Cited

U.S. PATENT DOCUMENTS

| | | | | |
|---|---|---|---|---|
| 425,297 A | * | 4/1890 | Capron ................... | B27B 27/02 83/438 |
| 702,043 A | * | 6/1902 | Zika ........................ | B27B 25/10 83/435.14 |
| 954,192 A | * | 4/1910 | Lambert ................. | B27B 27/02 83/438 |

(Continued)

FOREIGN PATENT DOCUMENTS

| | | |
|---|---|---|
| AU | 633343 B2 | 1/1993 |
| DE | 4025440 A1 | 2/1991 |

(Continued)

OTHER PUBLICATIONS https://patents.google.com/patent/SU1491709A1/en?oq=su1491709.*

(Continued)

*Primary Examiner* — Laura M Lee
(74) *Attorney, Agent, or Firm* — Heidi Eisenhut; Daniel Castro; LOZA & LOZA, LLP

(57) ABSTRACT

Various aspects are directed towards a benchtop circular saw. In a first aspect, a benchtop includes a sliding table having openings that facilitate coupling a removable fence with the sliding table. In another aspect, a removable fence includes a housing, a locking mechanism, and a locking peg in which the locking mechanism facilitates toggling the locking peg between a locked position and an unlocked position. In yet another aspect, benchtop includes a circular saw blade, a sliding table, and a removable fence. Here, the sliding table includes openings to facilitate attaching the removable fence onto the sliding table.

9 Claims, 25 Drawing Sheets

(56) References Cited

U.S. PATENT DOCUMENTS

| | | | | |
|---|---|---|---|---|
| 1,535,596 | A * | 4/1925 | French | B27G 19/02 83/875 |
| 1,820,667 | A * | 8/1931 | Leyes | F16B 37/045 269/93 |
| 1,947,885 | A * | 2/1934 | Tautz | B23Q 3/005 144/253.2 |
| 2,502,124 | A * | 3/1950 | Bray | B23D 47/025 83/435.14 |
| 2,895,515 | A * | 7/1959 | Ende | B27B 25/10 83/435.13 |
| 3,841,188 | A * | 10/1974 | Wiater | B27B 27/06 83/471.3 |
| 3,991,991 | A * | 11/1976 | Hammer | B23Q 3/005 269/318 |
| 4,408,509 | A * | 10/1983 | Winchip | B23D 47/025 144/286.5 |
| 4,519,280 | A * | 5/1985 | Cook | B23Q 9/0092 269/100 |
| 4,549,455 | A * | 10/1985 | Perilloux, Jr. | B27B 5/207 83/477.2 |
| 4,593,590 | A * | 6/1986 | Gray | B27B 27/10 83/435.2 |
| 4,892,021 | A * | 1/1990 | Sanderson | B23Q 9/0092 269/303 |
| 4,974,306 | A * | 12/1990 | Cole | B27B 5/222 29/434 |
| 5,215,296 | A * | 6/1993 | Adams | B23Q 1/58 269/60 |
| 5,297,463 | A | 3/1994 | O'Banion et al. | |
| 5,483,858 | A * | 1/1996 | Chen | B23D 47/04 269/303 |
| 5,758,557 | A * | 6/1998 | Moreton | B23Q 3/005 83/36 |
| 5,901,763 | A * | 5/1999 | You | B25H 1/0078 144/286.5 |
| 6,347,624 | B1 | 2/2002 | Smith et al. | |
| 7,077,043 | B1 * | 7/2006 | Koerble | B27B 29/10 144/204.2 |
| 8,004,664 | B2 * | 8/2011 | Etter | B23B 25/06 356/139.04 |
| 8,495,939 | B2 * | 7/2013 | Kani | B23D 47/04 83/490 |
| D718,595 | S * | 12/2014 | Shearer | D8/70 |
| 9,352,481 | B2 * | 5/2016 | Kimura | B23D 45/12 |
| 9,486,935 | B2 | 11/2016 | Niichel | |
| 9,616,587 | B2 * | 4/2017 | Xu | B27B 27/04 |
| 10,532,414 | B2 * | 1/2020 | Smith | B27B 27/02 |
| 10,562,205 | B2 * | 2/2020 | Manura | B23D 55/046 |
| 10,864,624 | B2 * | 12/2020 | Semann | B23D 47/025 |
| 11,548,183 | B2 * | 1/2023 | Shiel | B27B 27/02 |
| 2003/0150309 | A1 * | 8/2003 | Goodwin | B27B 27/10 83/435.12 |
| 2004/0118255 | A1 * | 6/2004 | Peters | B27G 19/02 83/13 |
| 2008/0053283 | A1 * | 3/2008 | Lin | B27B 27/04 83/440 |
| 2009/0095141 | A1 | 4/2009 | Billings et al. | |
| 2011/0167977 | A1 * | 7/2011 | Xu | B27B 27/10 83/471.2 |
| 2012/0098183 | A1 * | 4/2012 | Sharp | B23Q 3/06 269/315 |
| 2019/0111583 | A1 | 4/2019 | Brown | |
| 2019/0168346 | A1 | 6/2019 | Chang et al. | |
| 2021/0229196 | A1 * | 7/2021 | Guth | B28D 1/047 |

FOREIGN PATENT DOCUMENTS

| | | | | |
|---|---|---|---|---|
| EP | 0589282 | A1 * | 3/1994 | B27B 27/08 |
| FR | 2770162 | A1 | 4/1994 | |
| GB | 2118480 | A * | 11/1983 | B23Q 9/0085 |
| GB | 2281528 | A * | 3/1995 | B25B 1/103 |
| SU | 1491709 | A1 * | 7/1989 | B27C 5/04 |

OTHER PUBLICATIONS

SU1491709A1 abstract english translation Jul. 1989 Drabik Bogdan B27C5/04.*
International Search Report and Written Opinion for International Application No. PCT/US2021/015591, dated Apr. 1, 2021, 10 pages.
Corresponding European Application No. 21747370.1. Search Report (Jan. 23, 2024).

* cited by examiner

BENCHTOP CIRCULAR SAW APPARATUS WITH INTEGRATED MULTISTAGE FILTRATION SYSTEM

CROSS-REFERENCE TO RELATED APPLICATIONS

This application claims the benefit of U.S. Provisional Patent Application Ser. No. 62/967,007, filed Jan. 28, 2020, which is titled "BENCHTOP CIRCULAR SAW APPARATUS WITH INTEGRATED MULTISTAGE FILTRATION SYSTEM" and its entire contents of which are incorporated herein by reference.

TECHNICAL FIELD

The subject disclosure generally relates to dust collection, and more specifically to facilitating dust collection within a benchtop circular saw apparatus via a multistage filtration system.

BACKGROUND

When using conventional power saws, the release of airborne dust and particulate matter resulting from cutting a work piece is problematic. Health hazards associated with breathing in such dust is particularly problematic. Development of wet cutting devices is one solution to dust abatement, wherein water is applied at a blade cutting edge where dust is entrained to a fluid and directed to a holding area. While most wet cutting methods work relatively well, they create additional problems of waste water pollution and environmental concerns. Conventional masonry and tile saws, for instance, typically have a tub or pan of water with a pump that supplies water to the cutting head. While the saw is cutting, the water is sprayed and dispersed around the saw cutting area. Therefore, because this water can drip, spray, and potentially spill, the power saw cannot be placed in close proximity to where the actual masonry and or tile installation is taking place. The user thus spends a significant amount of time walking back and forth between the power saw and the installation area.

Accordingly, a dry operated power saw which prevents dust from escaping into the environment is desirable. To this end, it should be noted that the above-described deficiencies are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In accordance with one or more embodiments and corresponding disclosure, various non-limiting aspects are described in connection with a benchtop circular saw apparatus. In one such aspect, a benchtop apparatus to facilitate cuts of varying dimensions is disclosed. Within such embodiment, the apparatus includes a circular saw blade and a sliding table configured to slide along a side of the circular saw blade. Here, the sliding table includes a plurality of openings such that each of the plurality of openings are configured to facilitate coupling a removable fence with the sliding table.

In a further aspect, a removable fence apparatus is disclosed. For this embodiment, the removable fence apparatus includes a housing, a locking mechanism coupled to the housing, and a locking peg coupled to the locking mechanism and extending towards a bottom portion of the housing. Here, the locking mechanism is configured to toggle the locking peg between a locked position and an unlocked position such that the locked position facilitates affixing the removable fence onto a benchtop, and where the unlocked position facilitates removing the removable fence from the benchtop.

In yet another aspect, a benchtop apparatus is disclosed, which includes a circular saw blade, a sliding table configured to slide along a side of the circular saw blade, and a removable fence. For this embodiment, the sliding table comprises a plurality of openings, and the removable fence is configured to attach to and detach from the sliding table via a subset of the plurality of openings.

Other embodiments and various non-limiting examples, scenarios and implementations are described in more detail below.

BRIEF DESCRIPTION OF THE DRAWINGS

Various non-limiting embodiments are further described with reference to the accompanying drawings in which.

DETAILED DESCRIPTION

Overview

Figure 1:
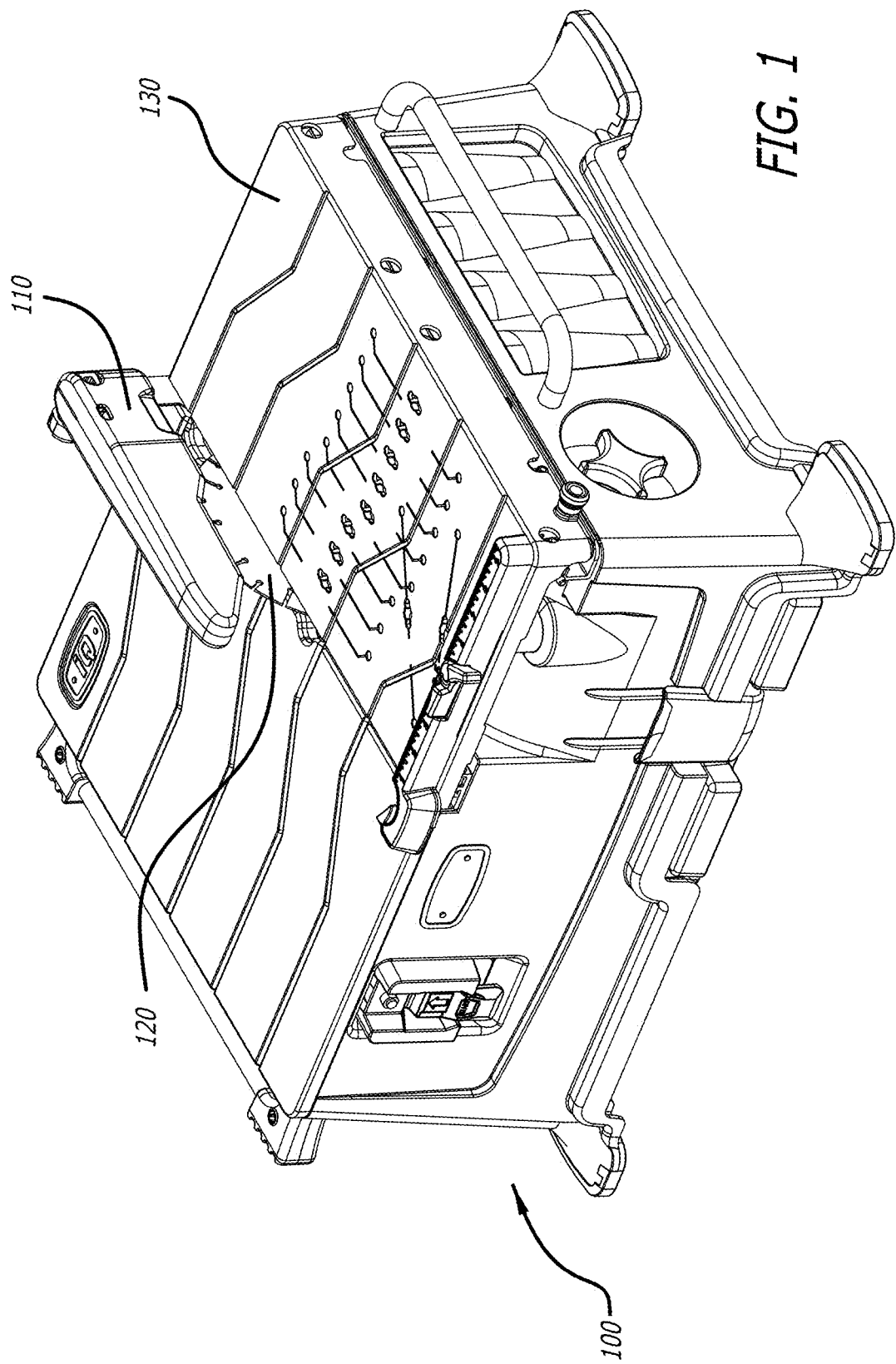
FIG. 1 is a photo illustrating a first perspective view of a benchtop circular saw in accordance with an aspect of the subject specification.
Figure 2:
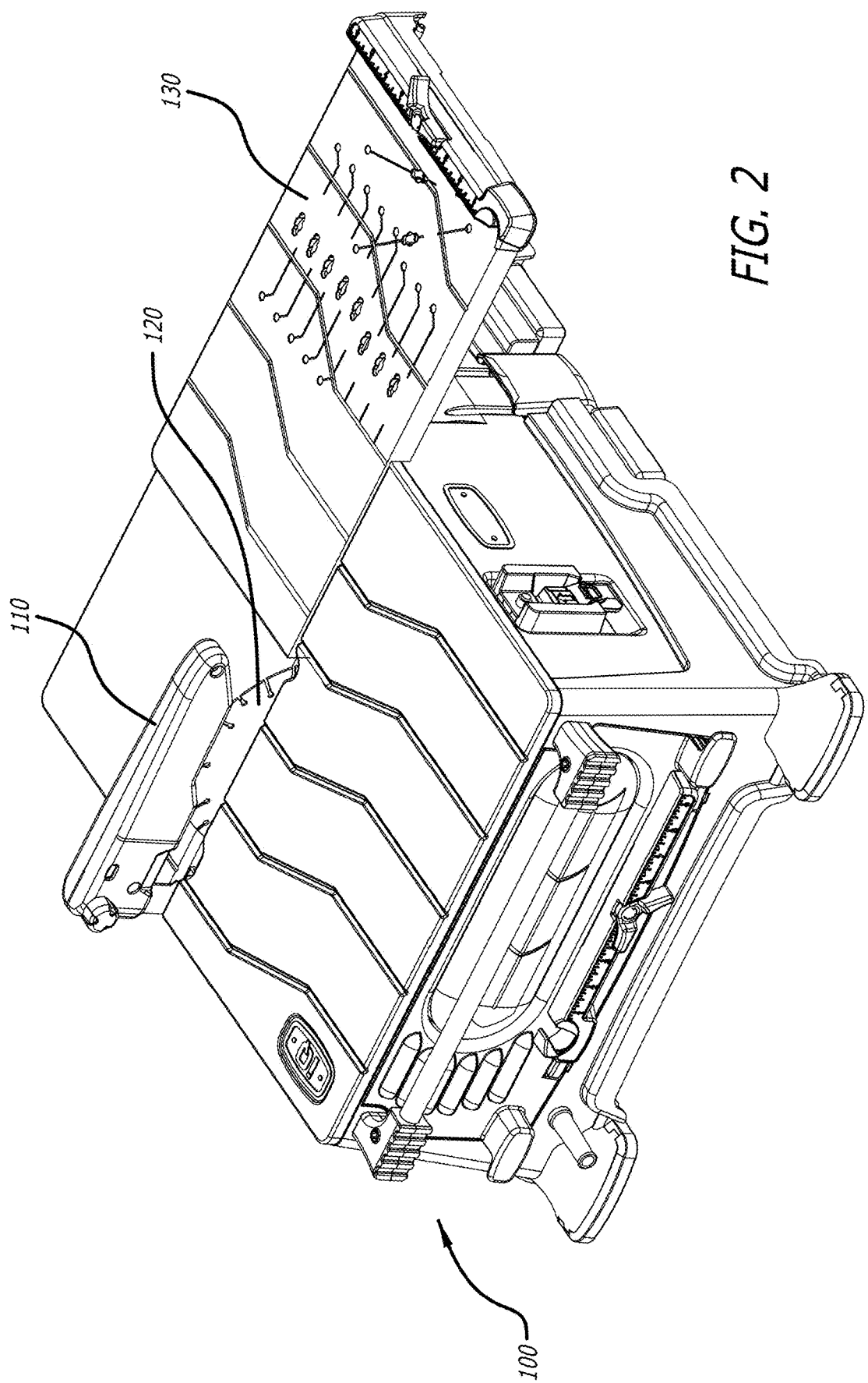
FIG. 2 is a photo illustrating a second perspective view of a benchtop circular saw in accordance with an aspect of the subject specification.
Figure 3:
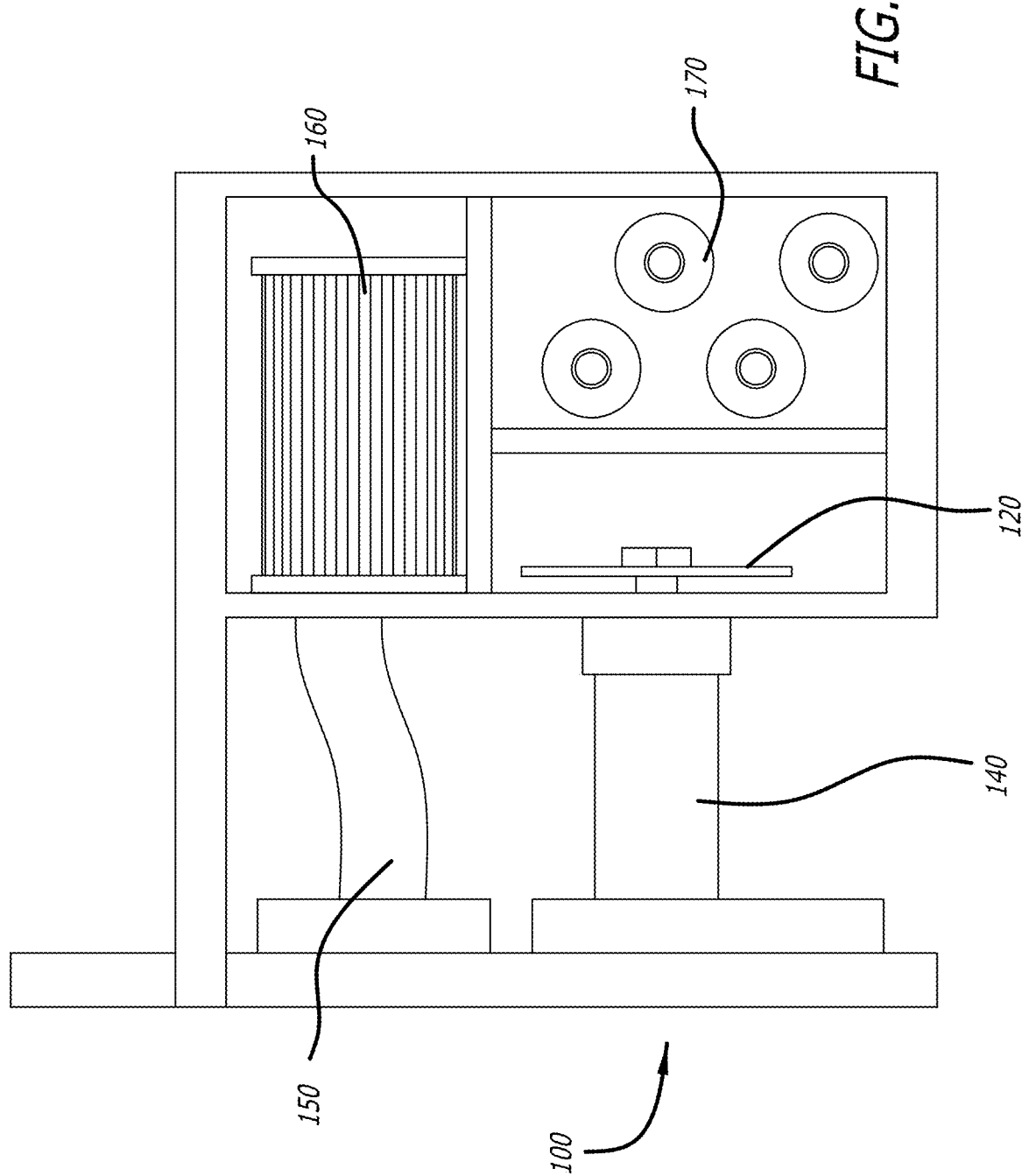
FIG. 3 is a photo illustrating a bottom view of a benchtop circular saw in accordance with an aspect of the subject specification.

The various embodiments disclosed herein are directed towards dust collection within a benchtop circular saw apparatus via a multistage filtration system. In FIGS. 1-3, various photos are provided showing different views of an exemplary benchtop circular saw in accordance with an aspect of the subject specification. As illustrated, benchtop circular saw 100 comprises a dust guard 110, a circular saw blade 120, a sliding table 130, a multi-purpose motor 140, a vacuum 150, a cylindrical filter 160, and cyclonic filters 170. As will be discussed in greater detail below with reference to the remaining figures, it is contemplated that the worktable 120 will comprise a center slot axially aligned to the circular saw blade 120. During use, the vacuum 150 is configured to provide a negative pressure beneath the benchtop circular saw 100 at the center slot, whereas the cylindrical filter 160 and cyclonic filters 170 are configured to collect airborne dust drawn by the negative pressure from an area proximate to the center slot.

Various aspects of the benchtop circular saw 100 are contemplated and disclosed herein. For instance, in a first aspect, it is contemplated that the multi-purpose motor 140 is used to simultaneously drive both the circular saw blade 120 and the vacuum 150. Within such embodiment, the multi-purpose motor 140 may be coupled to circuitry that protects against sudden fluctuations in current/voltage during use. Such fluctuations may, for example, occur when the circular saw blade 120 begins to make contact with a work piece and/or as the vacuum 150 responds to fluctuating air flow conditions (e.g., as cylindrical filter 160 and/or cyclonic filters 170 become clogged). In a particular implementation, the circuitry coupled to the multi-purpose motor 140 monitors the individual current/voltage of the circular saw blade 120 and the vacuum 150, as well as the combined current/voltage of the circular saw blade 120 and the vacuum 150. Within such embodiment, if the combined current/voltage of the circular saw blade 120 and the vacuum 150 exceeds a first threshold value, the circuitry is configured to remain below a second threshold value by decreasing the current/voltage provided to one component so that the increased current/voltage needed by the other component may be provided. For example, a brief spike in current/voltage may occur when the circular saw blade 120 first makes contact with a work piece. During that brief spike, current/voltage to the vacuum 150 may be reduced so that increased current/voltage may be provided to the circular saw blade 120 without the combined current/voltage exceeding an unacceptable value.

Various other aspects are also disclosed herein, which are described in further detail below. For instance, it is contemplated that the dust guard 110 may be configured to capture airborne dust emanating from the rear of the circular saw blade 120 as it rotates. (See e.g., FIGS. 4-6). It is also contemplated that a removeable fence may be coupled to the sliding table 130 according to different configurations to facilitate different cuts that may be desired. (See e.g., FIGS. 7-15). In another aspect of the disclosure, it is contemplated that the vacuum 150 may comprise a rotatable spindle which facilitates readily removing the cylindrical filter 160. (See e.g., FIG. 16).

Exemplary Dust Guard Embodiments

Figure 4:
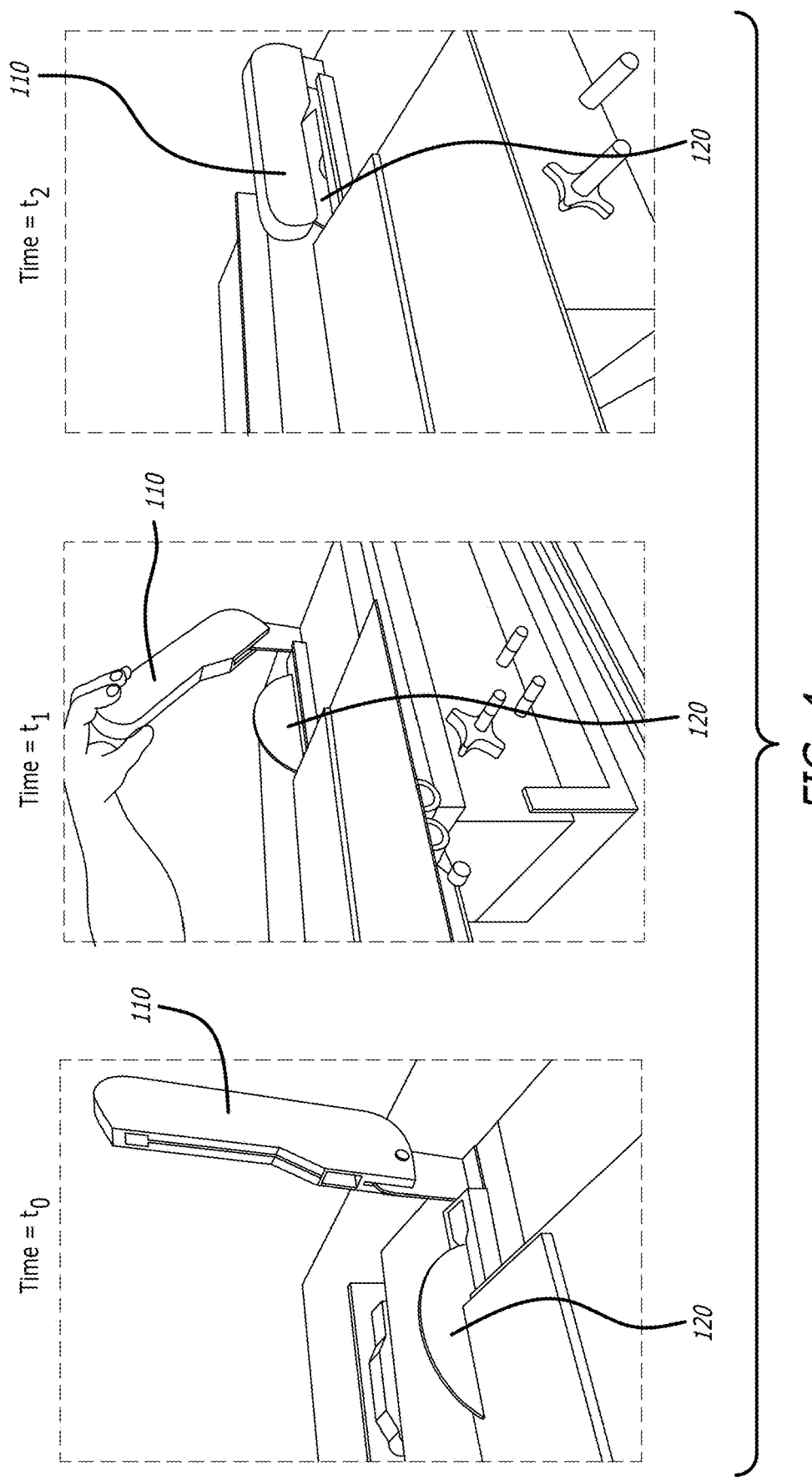
FIG. 4 is a series of photos illustrating an exemplary use of a benchtop circular saw in accordance with an aspect of the subject specification.
Figure 5:
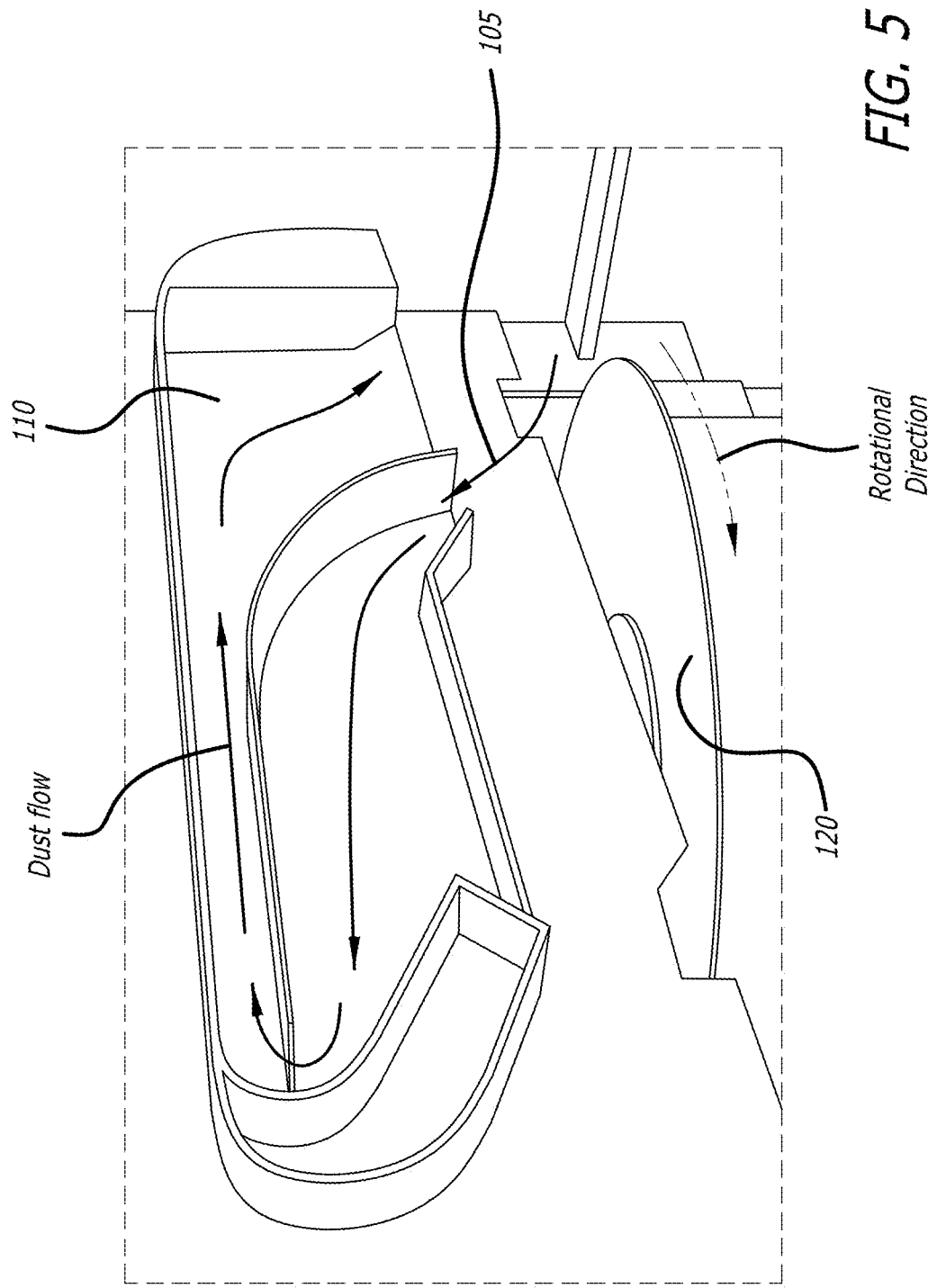
FIG. 5 is a photo illustrating a cross section view of an exemplary dust guard in accordance with an aspect of the subject specification.
Figure 6:
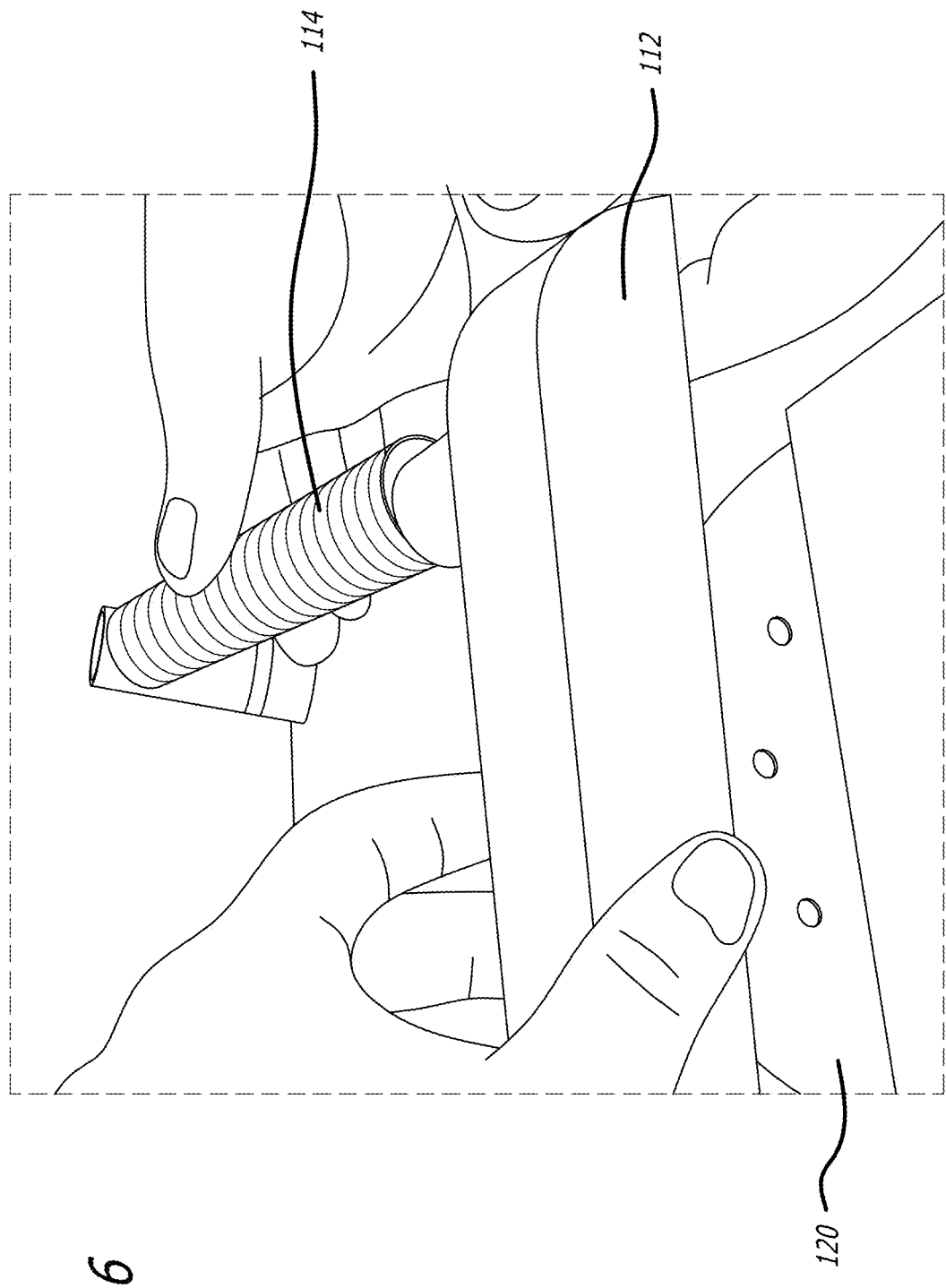
FIG. 6 is a photo illustrating a second exemplary dust guard in accordance with an aspect of the subject specification.
Figure 7:
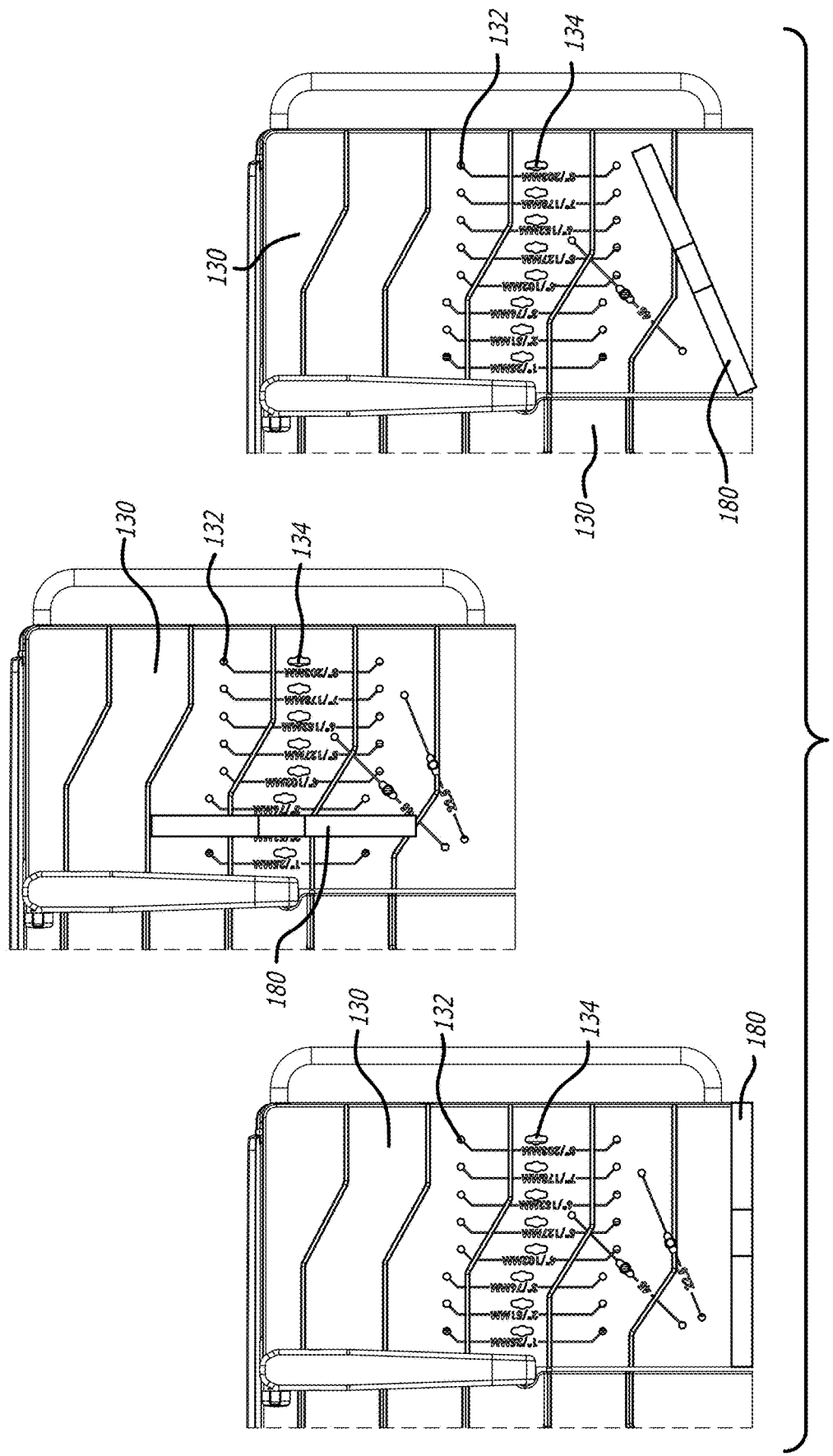
FIG. 7 is a series of photos illustrating various configurations of an exemplary removable fence in accordance with an aspect of the subject specification.

Referring next to FIGS. 4-6, illustrations of various dust guard embodiments are provided in accordance with aspects disclosed herein. For instance, in FIG. 4, a series of photos are provided illustrating an exemplary use of the benchtop circular saw 100. As illustrated, it is contemplated that the dust guard 110 may pivot towards the circular saw blade 120 from the rear, wherein the dust guard 110 substantially encloses the circular saw blade 120. During use, as the circular saw blade 120 rotates, it is noted that dust shoots up the benchtop circular saw 100 from the rear of the circular saw blade 120. In a particular embodiment disclosed herein, dust that shoots up from the rear of the circular saw blade 120 is routed within the dust guard 110 along the dust path illustrated in FIG. 5 and into the heavy debris chute 105. As a result, airborne dust from the rear of the circular saw blade 120 is desirably contained within the benchtop circular saw 100 rather than being released into the atmosphere where it can harm the user. Here, it should be appreciated that dust guard 110 may also comprise vent holds to improve circulation. Also, although FIG. 5 illustrates a configuration of dust guard 110 in which the dust follows a vertical path after exiting the rear of the circular saw blade 120, it should be appreciated that dust guard 110 may also be configured to provide a path in which the dust follows a lateral path after exiting the rear of the circular saw blade 120.

In an alternative embodiment, rather than having dust from the rear of the circular saw blade 120 circuitously routed within the path of dust guard 110, it is contemplated that an auxiliary vacuum attachment may be used. Namely, as illustrated in FIG. 6, it is contemplated that a dust guard 112 may be coupled to an auxiliary vacuum 114, wherein the auxiliary vacuum 114 is configured to suction dust that dust shoots up the benchtop circular saw 100 during use from the rear of the circular saw blade 120.

Exemplary Removable Fence Embodiments

Referring next to FIGS. 7-12, illustrations of various removable fence embodiments are provided in accordance with aspects disclosed herein. For instance, in FIG. 7, a series of photos are provided illustrating various configurations of an exemplary removable fence. As illustrated, it is contemplated that at least each of a horizontal, vertical, and angular configuration may be provided. Namely, it is contemplated that the removable fence 180 may be coupled to the sliding table 130 according to different configurations to facilitate different cuts that may be desired by a user. For this particular embodiment, the sliding table 130 includes a plurality of stabilizing holes 132 and a plurality of locking holes 134, as illustrated. Here, although the spacing between the plurality of stabilizing holes 132 and the plurality of locking holes 134 can vary, the illustrated spacing includes various horizontal spacing options (e.g., one inch apart), and two angular spacing options (e.g., one at 45 degrees and one at 22.5 degrees).

Figure 8:
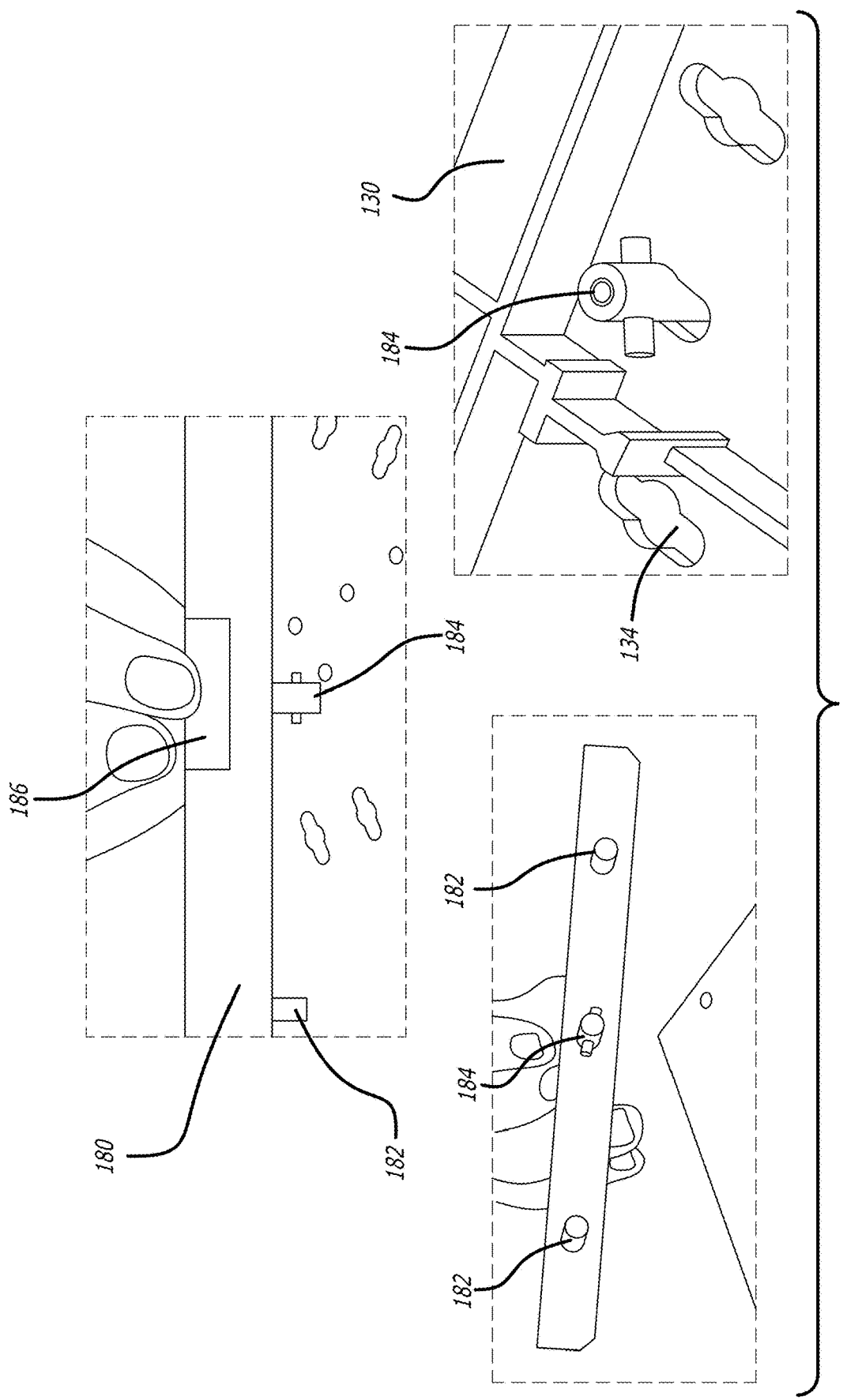
FIG. 8 is a series of photos illustrating various views of an exemplary removable fence in accordance with an aspect of the subject specification.
Figure 9:
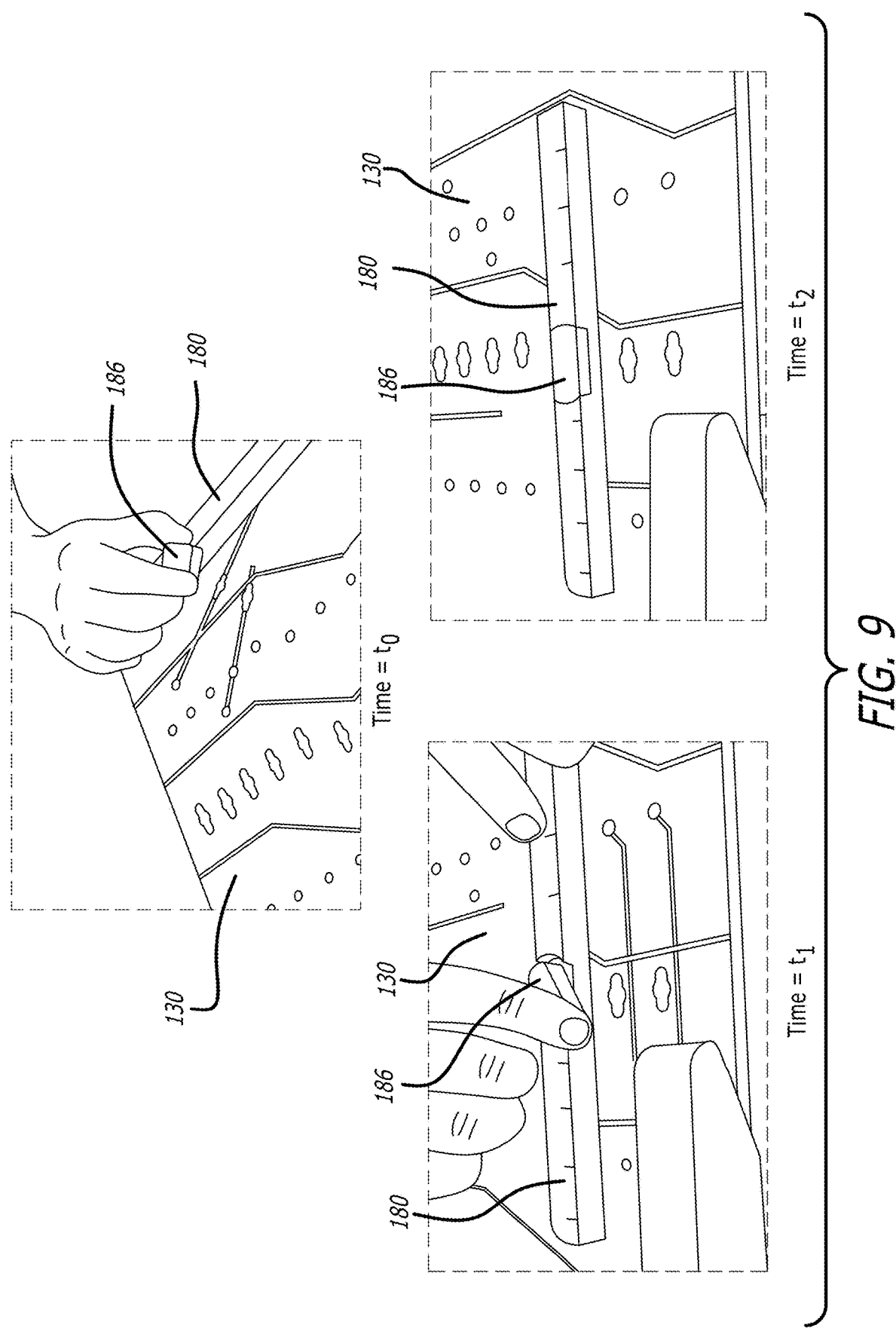
FIG. 9 is a series of photos illustrating a configuration adjustment of an exemplary removable fence in accordance with an aspect of the subject specification.

Referring next to FIG. 8, a series of photos are provided illustrating various views of an exemplary removable fence in accordance with an aspect of the subject specification. As illustrated, a removable fence 180 may include stabilizing pegs 182, a locking peg 184, and a knob 186. Within such embodiment, it is contemplated that the removable fence 180 may be configured to attach to the sliding table 130 via the stabilizing pegs 182 and the locking peg 184. Namely, it is contemplated that the locking peg 184 may be inserted into any of locking holes 134, wherein the removable fence 180 is securely coupled onto the sliding table 130 by twisting the knob 186, and wherein the removable fence 180 is stabilized onto the sliding table 130 by inserting the stabilizing pegs 182 into corresponding stabilizing holes 132. An exemplary time lapse of such procedure is illustrated in FIG. 9, wherein the removable fence 180 is moved from a horizontal configuration to a vertical configuration.

Figure 10:
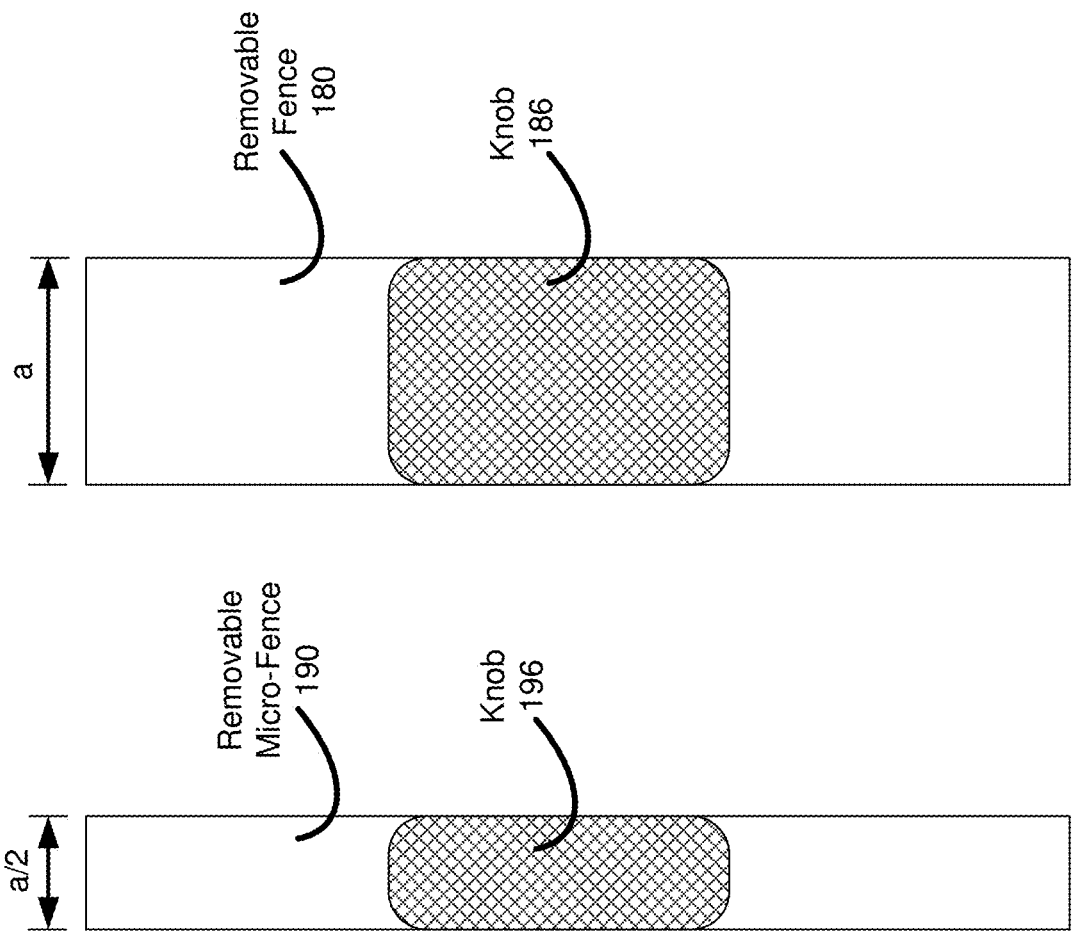
FIG. 10 is a schematic of an exemplary micro-fence in accordance with an aspect of the subject specification.

In another aspect, a "micro-fence" is contemplated where cuts requiring fine adjustments are desired. For instance, as illustrated in FIG. 10, a removable micro-fence 190 with knob 196 is contemplated, which may be substantially similar to removable fence 180 with knob 186. For this particular example, however, the removable micro-fence 190 is half the width of removable fence 180. Therefore, if the stabilizing holes 132 and locking holes 134 are one inch apart, for example, utilizing a removable micro-fence 190 can facilitate cuts with half inch increments.

Figure 11:
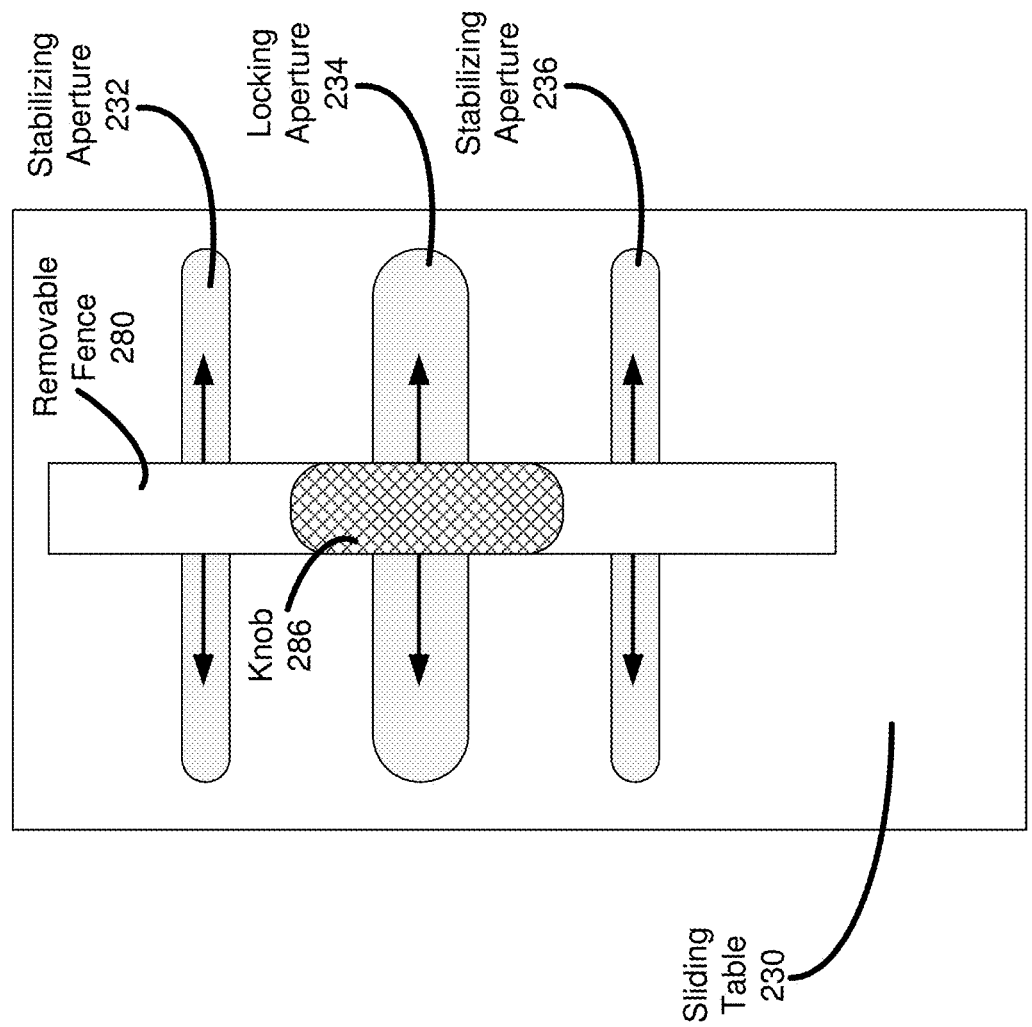
FIG. 11 is a schematic of an exemplary horizontal fence adjustment mechanism in accordance with an aspect of the subject specification.
Figure 12:
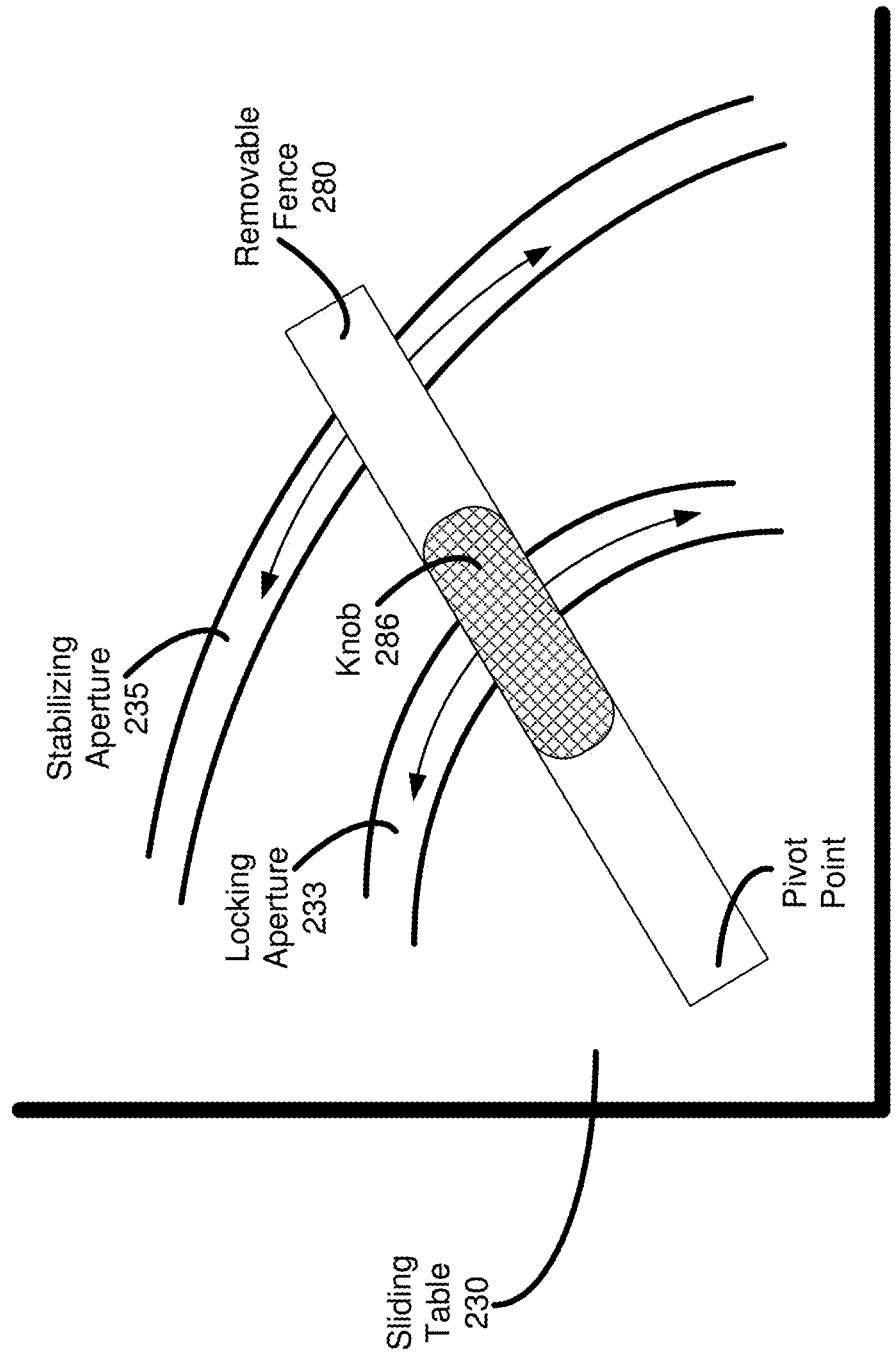
FIG. 12 is a schematic of an exemplary rotational fence adjustment mechanism in accordance with an aspect of the subject specification.
Figure 13:
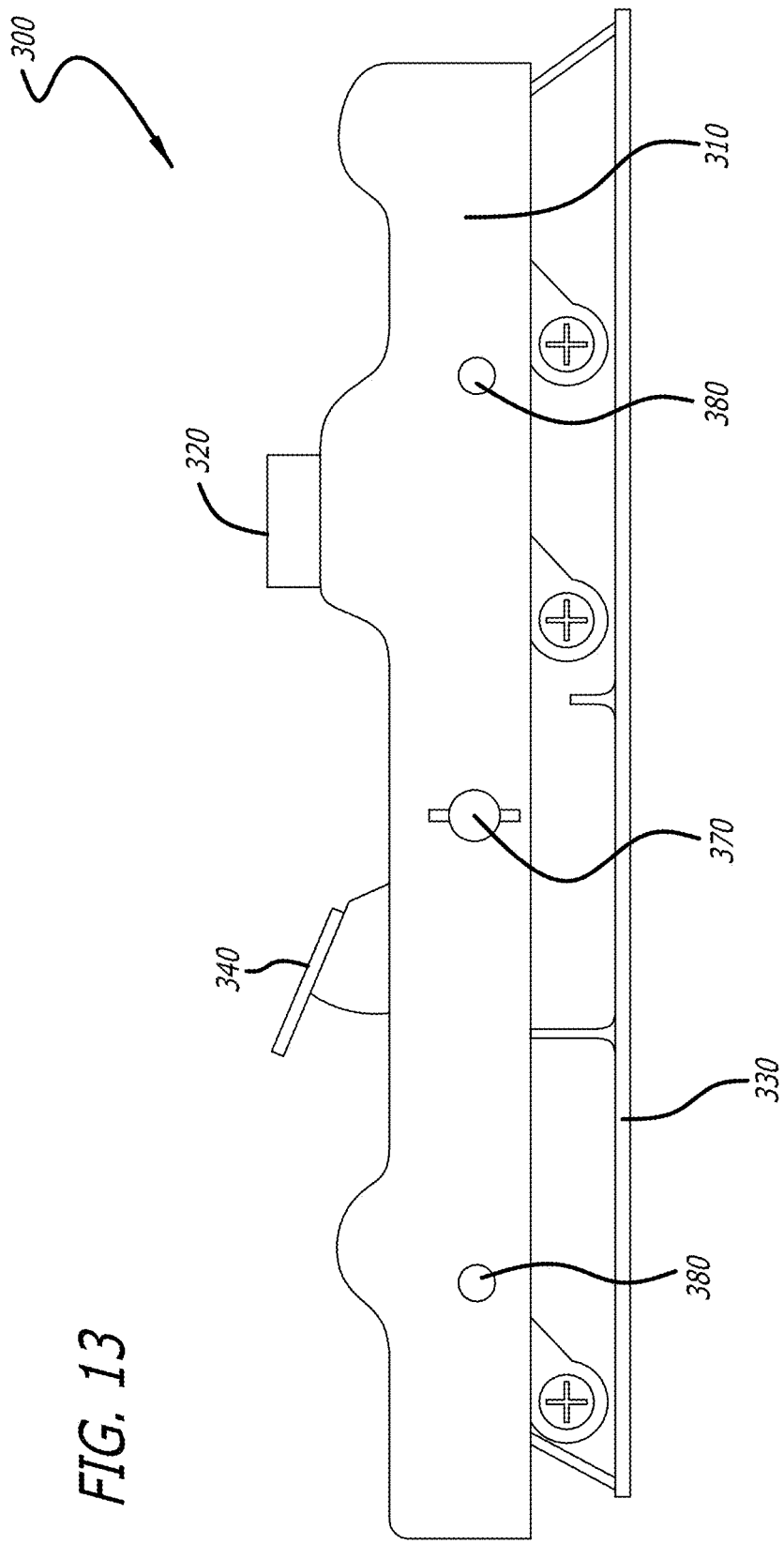
FIG. 13 illustrates a bottom view of an exemplary micro-fence configuration in accordance with an aspect of the subject specification.
Figure 14:
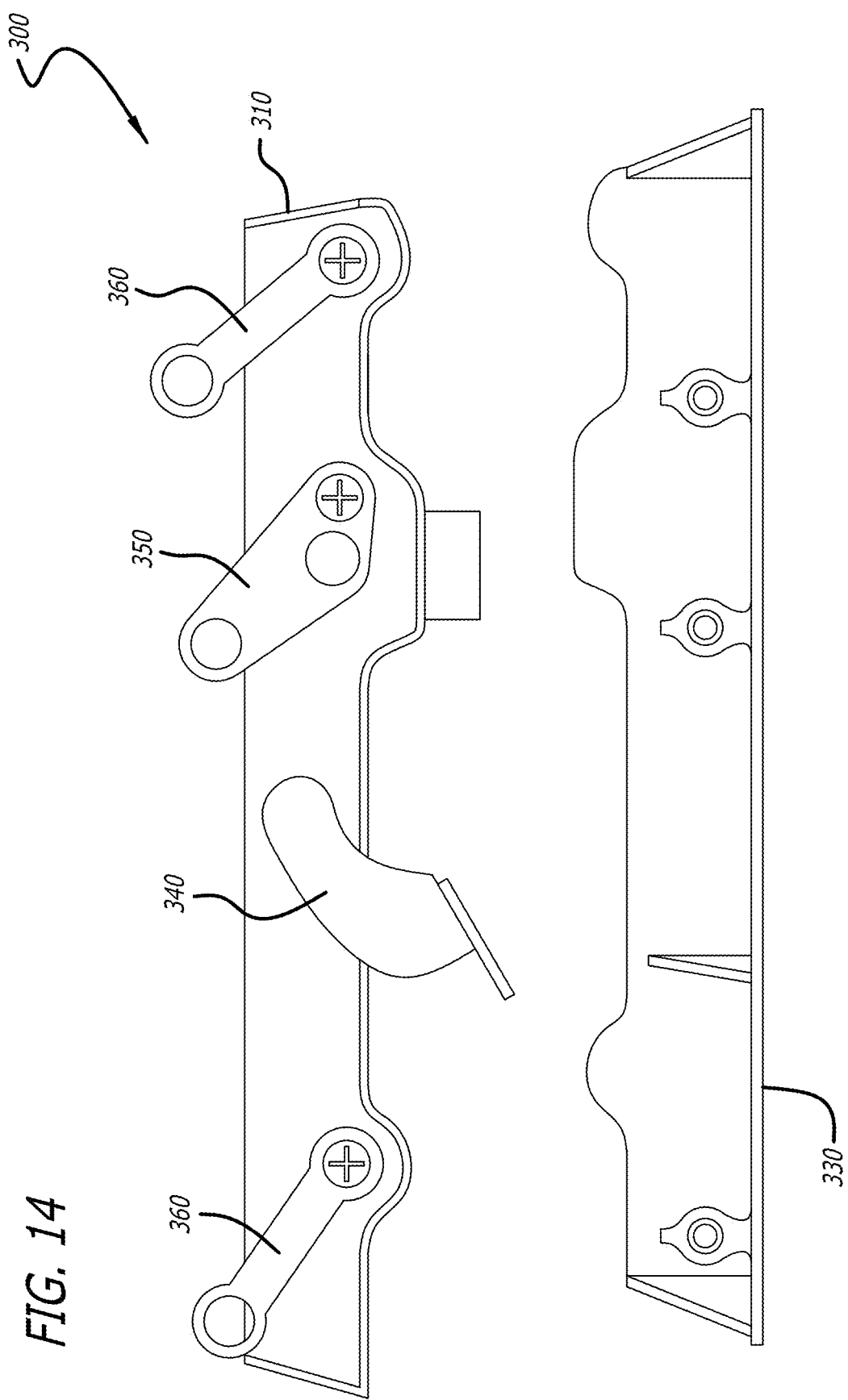
FIG. 14 illustrates a disassembled view of the exemplary micro-fence configuration provided in FIG. 13.
Figure 15:
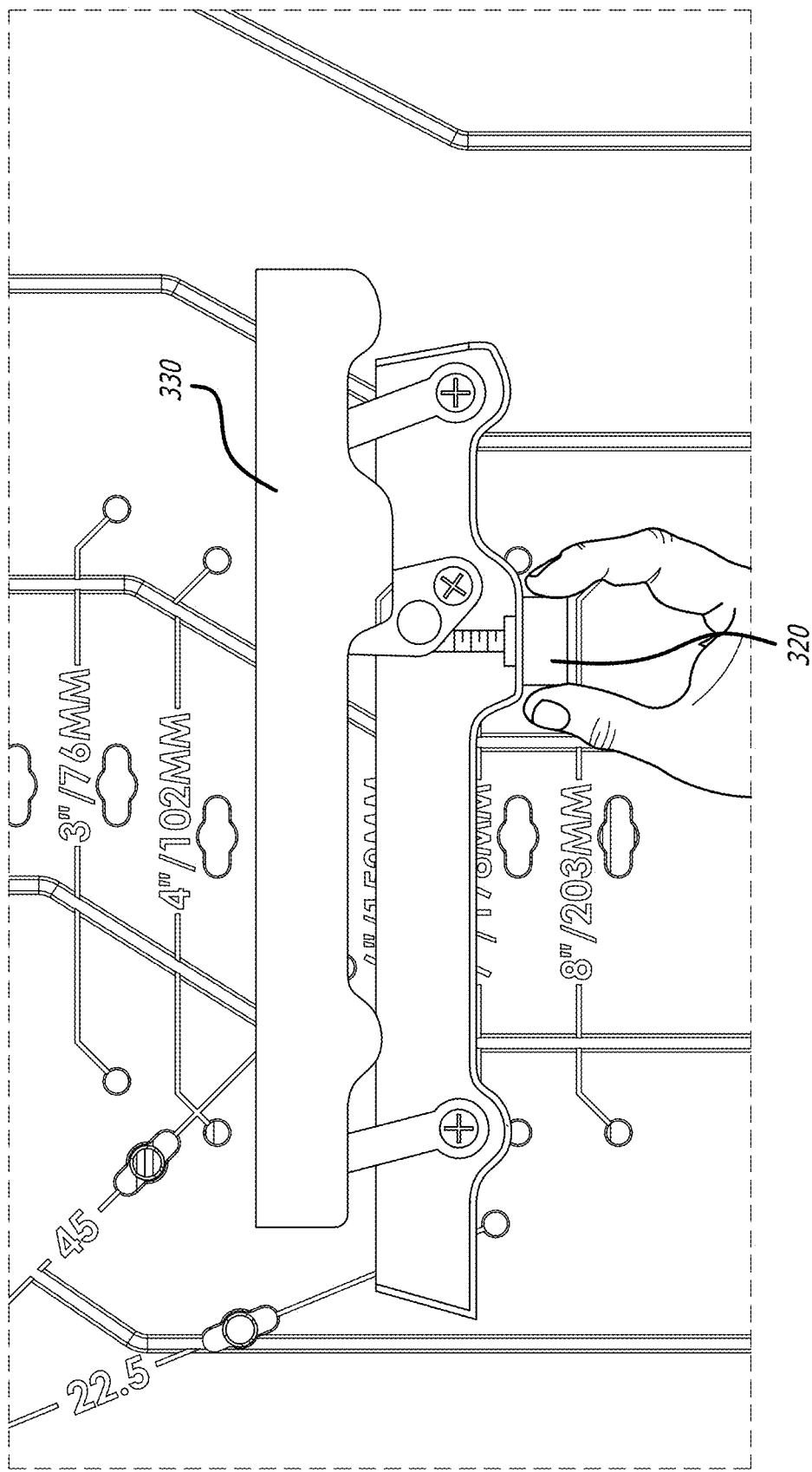
FIG. 15 illustrates a view of the exemplary micro-fence configuration provided in FIG. 13 attached to a sliding table in accordance with an aspect of the subject specification.

Referring next to FIGS. 11-12, an alternative fence adjustment mechanism is contemplated. For instance, in FIG. 11 a schematic of an exemplary horizontal fence adjustment mechanism in accordance with an aspect of the subject specification. Within such embodiment, a sliding table 230 includes a first and second stabilizing aperture, 232 and 236, as well as a locking aperture 234, as shown. Here, it is contemplated that a removable fence 280 may be configured to slide along the locking aperture 234 and the stabilizing apertures, 232 and 236, wherein the locking peg and the stabilizing pegs may be utilized to secure the removable fence 280 onto the sliding table 230 (e.g., by locking the removable fence 280 via knob 286).

A sliding mechanism for rotational fence adjustments is also contemplated, as illustrated in FIG. 12. Within such embodiment, a first stabilizing peg secures the removable fence 280 at a fixed pivot point, wherein a locking peg slides within a locking aperture 233, and wherein a second stabilizing peg slides within a stabilizing aperture 235. The locking peg and the second stabilizing peg may then be utilized to secure the removable fence 280 onto the sliding table 230 (e.g., by locking the removable fence 280 via knob 286).

In a further aspect, yet another "micro fence" embodiment is contemplated where cuts requiring fine adjustments are desired. Here, a removable fence is contemplated in which fine adjustments are made via a movable wall. Exemplary configurations of such embodiment are provided in FIGS. 13-15. As illustrated, it is contemplated that a removable fence 300 may include a movable wall 330 coupled to a side portion of a housing 310. For this particular embodiment, the removable fence 300 may further include an adjustment knob 320 configured to push the movable wall 330 away from the housing 310 when the adjustment knob 320 is twisted in a first direction, and where the adjustment knob 320 is configured to pull the movable wall towards the housing when the adjustment knob 320 is twisted in an opposite direction. The removable fence 300 may also include at least one arm 350 coupled to the adjustment knob 320 on a first end of the at least one arm 350, and coupled to the movable wall 330 on an opposite end of the at least one arm 350. As illustrated, the removable fence 300 may also include at least one arm 360 coupled to a stabilizing peg 380 on a first end of the at least one arm 360, and coupled to the movable wall 330 on an opposite end of the at least one arm 360. To facilitate measuring the fine adjustments disclosed herein, it is further contemplated that the removable fence 300 may include demarcations indicating how far the movable wall 330 is expanded from the housing 310.

Various other aspects of removable fence 300 are contemplated as well. For instance, the locking mechanism of removable fence 300 may be a lever 340 positioned on a side portion of the housing 310, rather than a knob. Within such embodiment, a spring may be coupled to the lever 340, wherein the spring is configured to provide resistance when the lever 340 pushes a locking peg 370 into an unlocked position, and wherein the spring is configured to retract the locking peg 370 into a locked position when the lever 340 is released (i.e., where the lever twists the locking peg 370).

Exemplary Rotatable Spindle Embodiments

Figure 16:
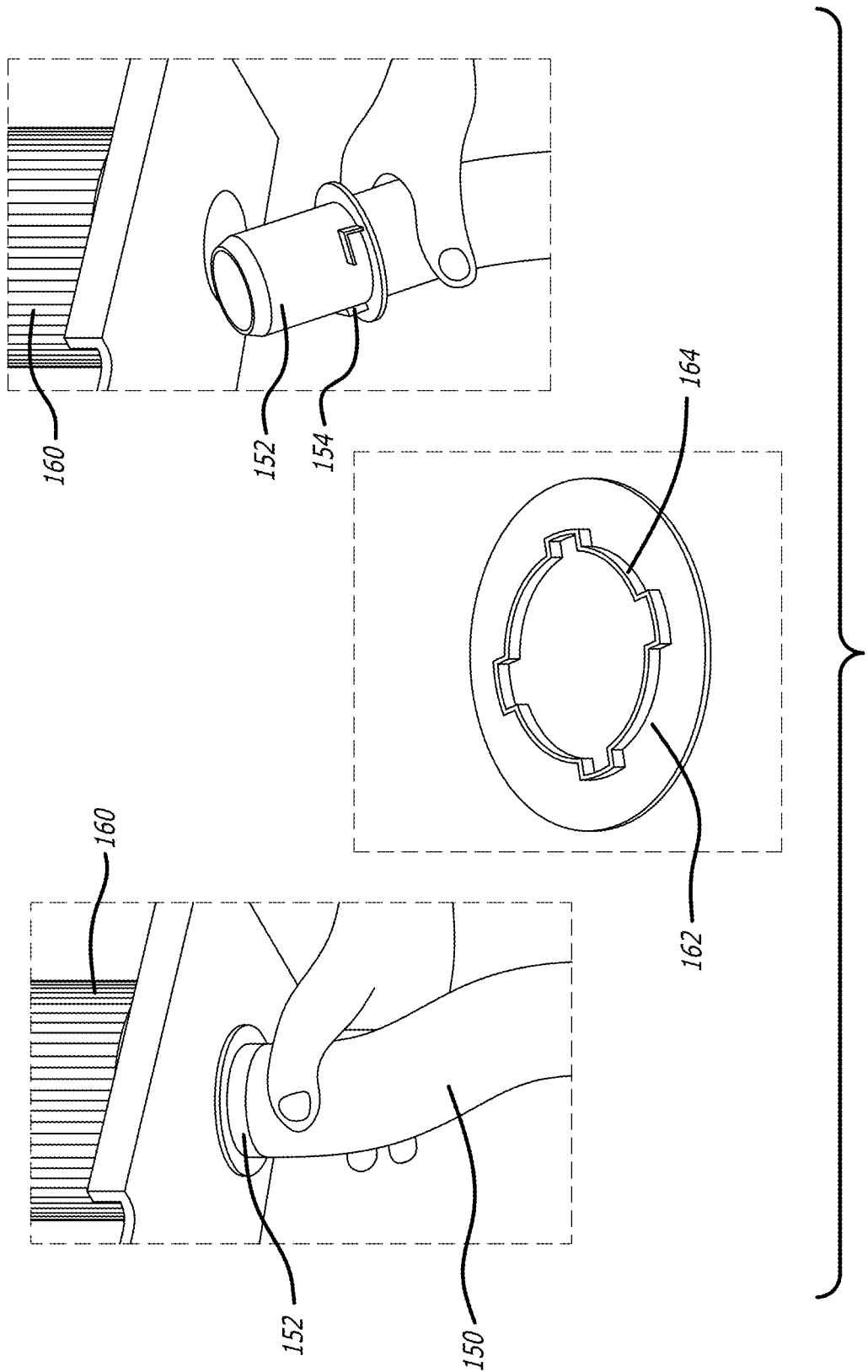
FIG. 16 is a series of photos illustrating the removal of an exemplary spindle in accordance with an aspect of the subject specification.
Figure 17:
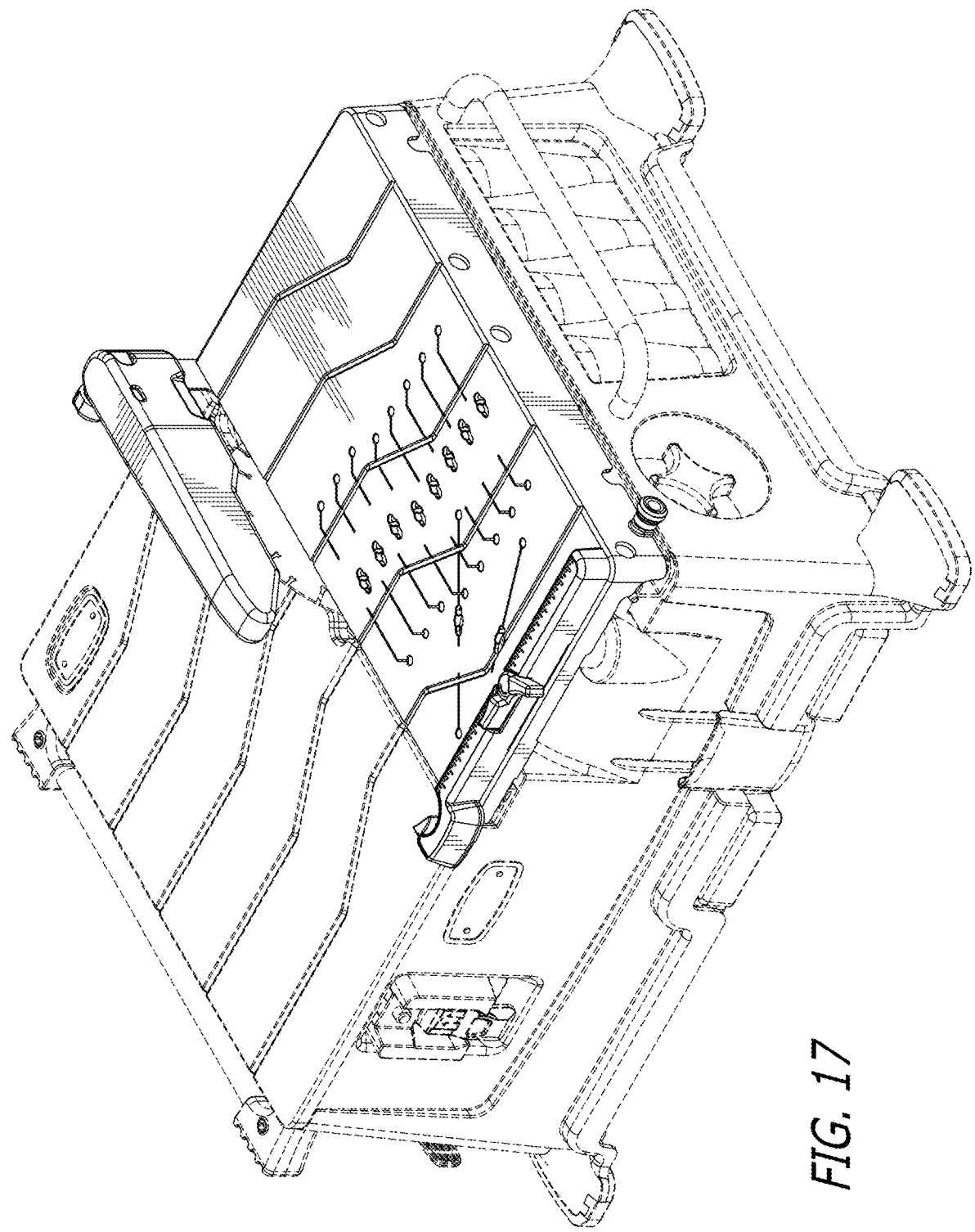
FIG. 17 is a front top right perspective of a benchtop saw with blade guard and slidable fence of the present invention with the slidable fence perpendicular to the blade guard.
Figure 18:
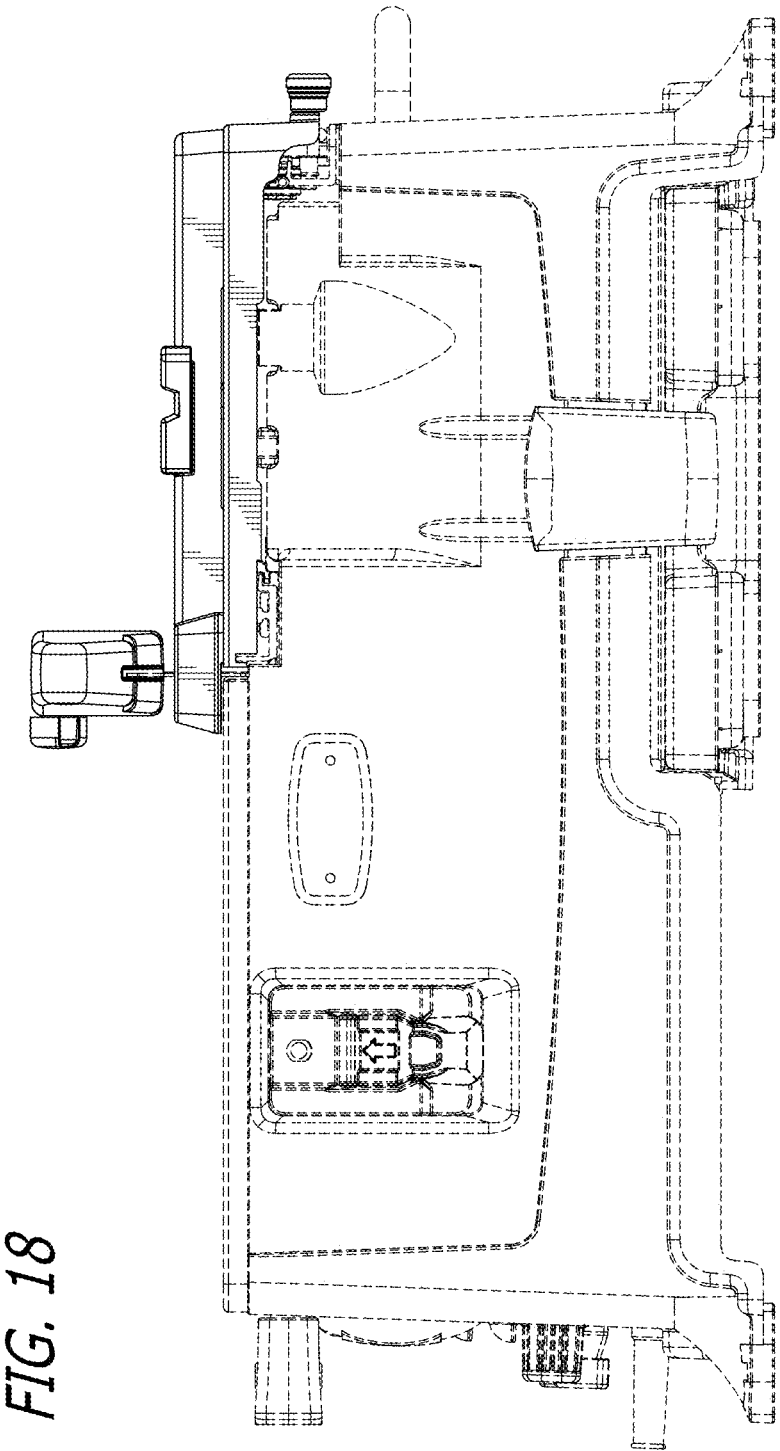
FIG. 18 is a front elevation of the benchtop saw with blade guard and slidable fence of FIG. 17.
Figure 19:
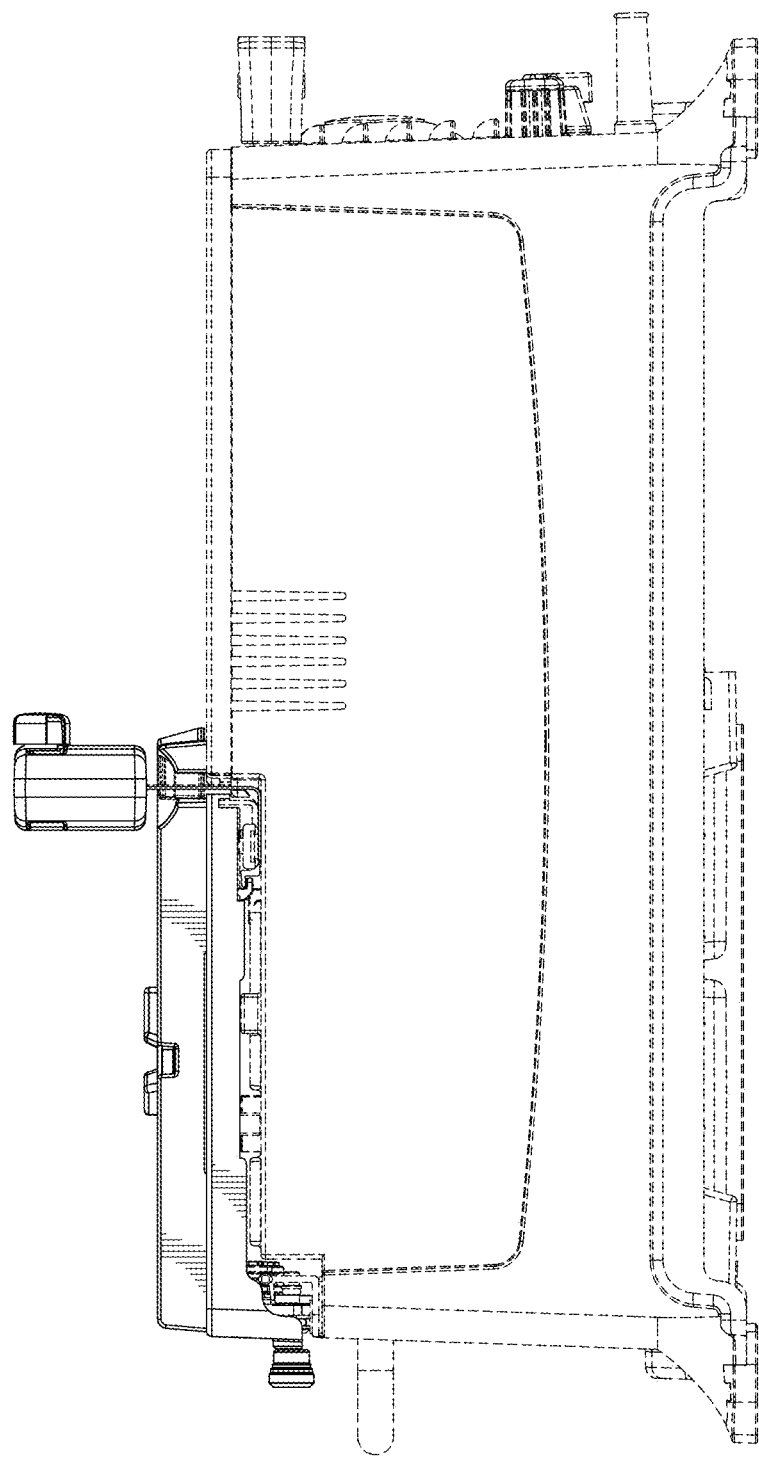
FIG. 19 is a rear elevation of the benchtop saw with blade guard and slidable fence of FIG. 17.
Figure 20:
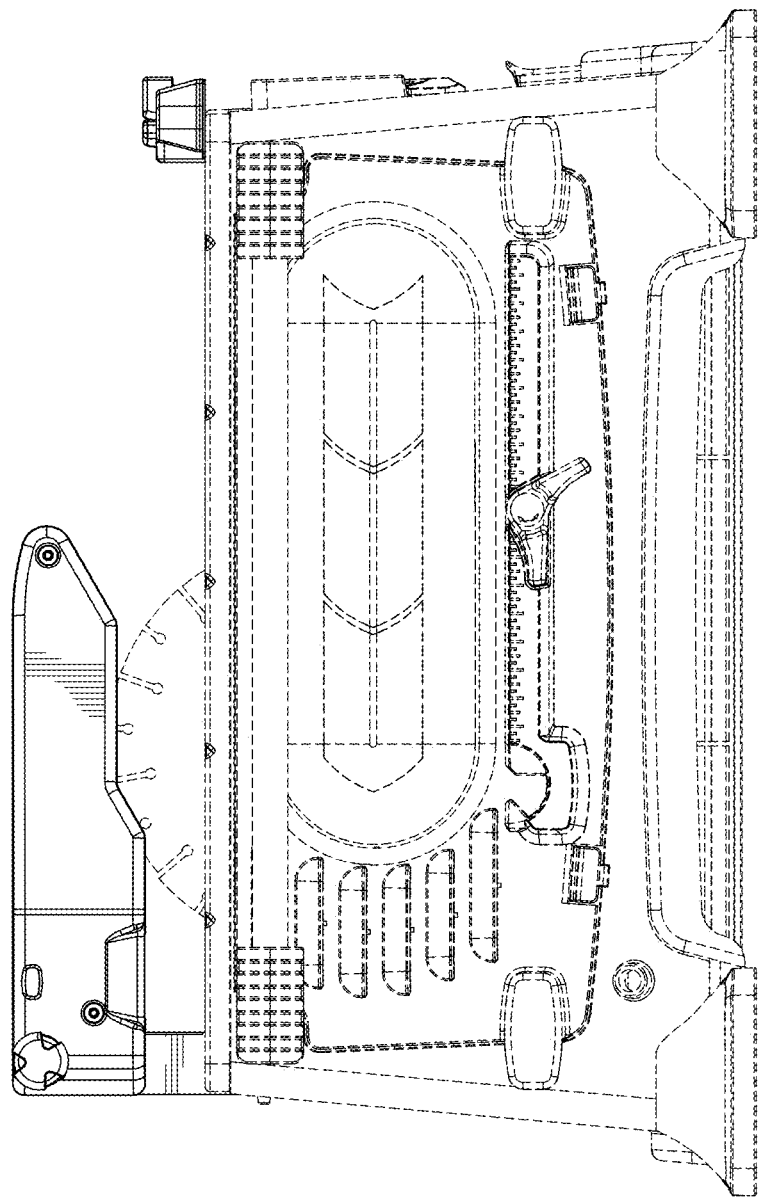
FIG. 20 is a right side elevation of the benchtop saw with blade guard and slidable fence of FIG. 17.
Figure 21:
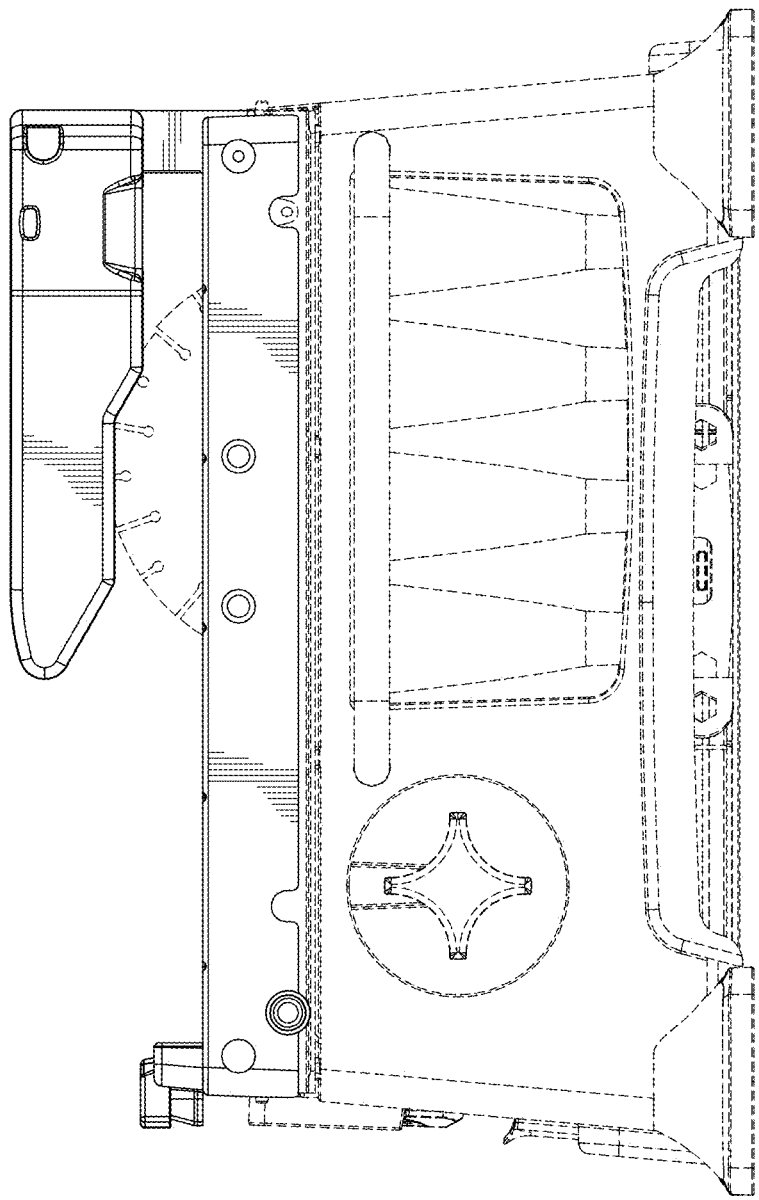
FIG. 21 is a left side elevation of the benchtop saw with blade guard and slidable fence of FIG. 17.
Figure 22:
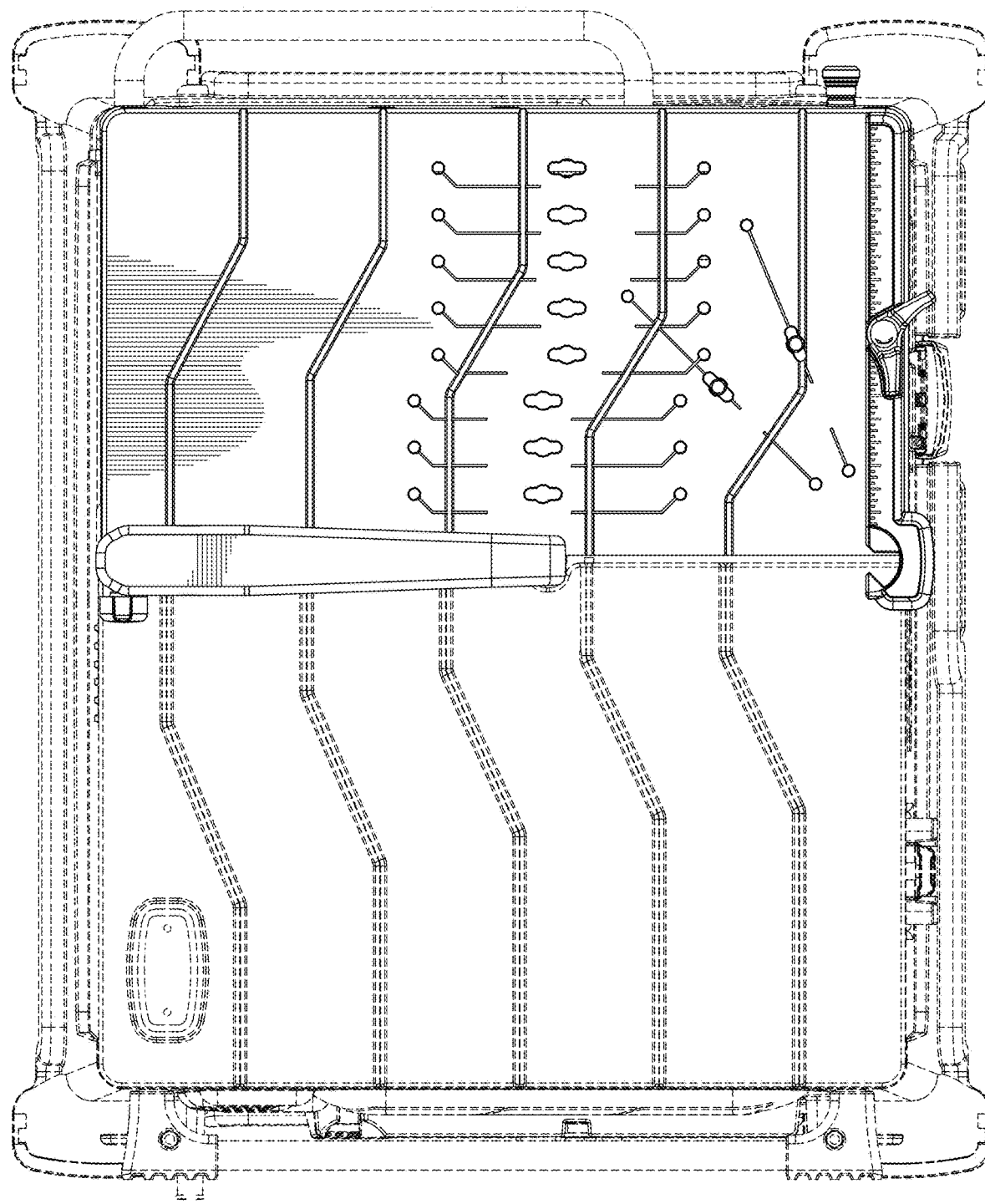
FIG. 22 is a top plan view of the benchtop saw with blade guard and slidable fence of FIG. 17.
Figure 23:
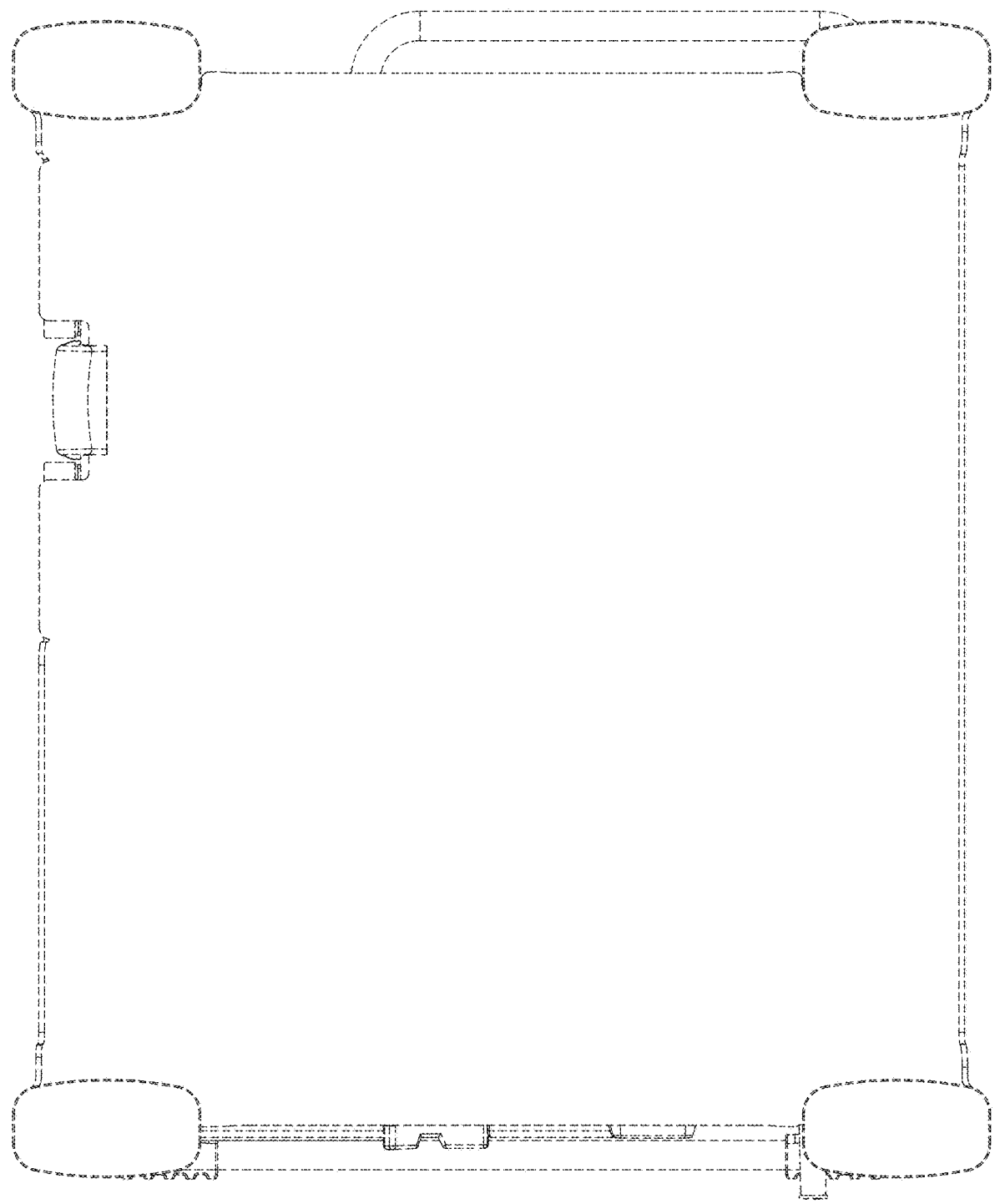
FIG. 23 is a bottom plan view of the benchtop saw with blade guard and slidable fence of FIG. 17.
Figure 24:
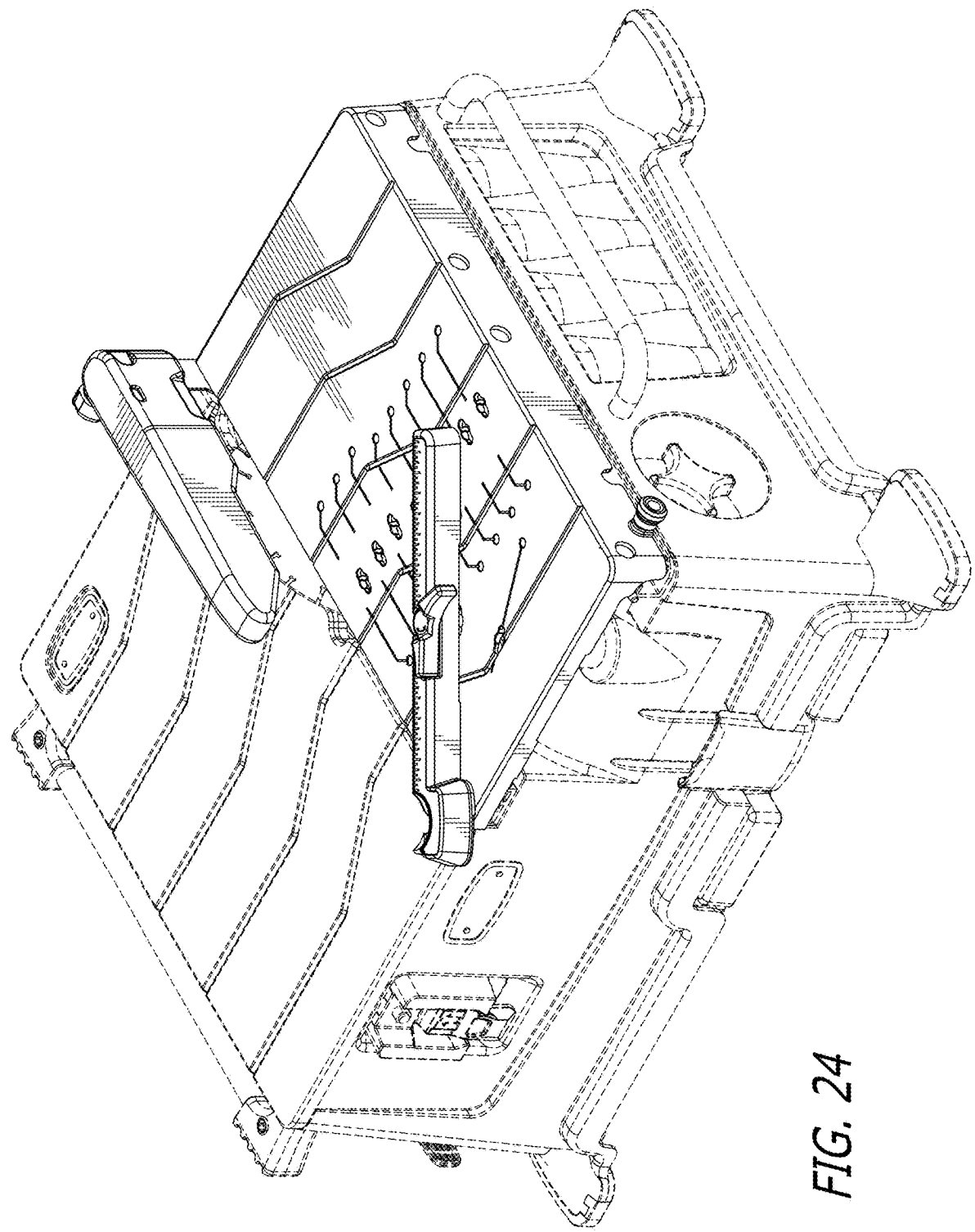
FIG. 24 is a front top right perspective of the benchtop saw with blade guard and slidable fence of FIG. 17 with the slidable fence in an angular orientation relative to the blade guard.
Figure 25:
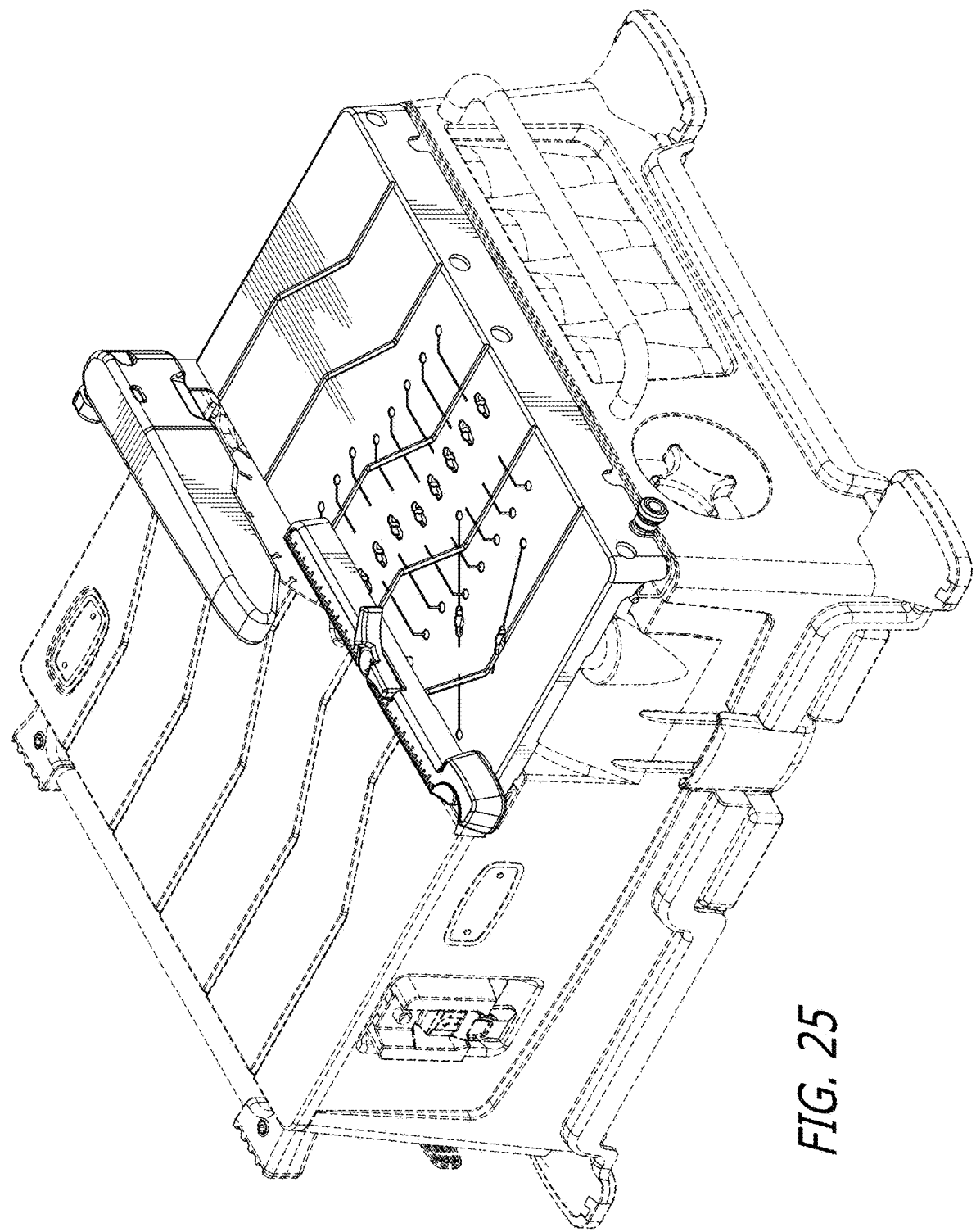
FIG. 25 is a front top right perspective of the benchtop saw with blade guard and slidable fence of FIG. 17 with the slidable fence parallel to the blade guard.

Referring next to FIG. 16, a series of photos are provided illustrating the removal of an exemplary spindle in accordance with an aspect of the subject specification. Here, it is contemplated that the vacuum 150 may comprise a rotatable spindle 152 which facilitates readily removing the cylindrical filter 160. As illustrated, the rotatable spindle 152 may comprise male notches 154 that are configured to mate with female notches 164 of interface 162.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components coupled to other components rather than included within parent components (hierarchical). Additionally, it is noted that one or more components may be combined into a single component providing aggregate functionality or divided into several separate sub-components, and any one or more middle layers may be provided to couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter can be appreciated with reference to the various figures. While for purposes of simplicity of explanation, the methodologies are described as a series of steps, it is to be understood and appreciated that the disclosed subject matter is not limited by the order of the steps, as some steps may occur in different orders and/or concurrently with other steps from what is described herein. Moreover, not all disclosed steps may be required to implement the methodologies described hereinafter.

While the various embodiments have been described in connection with the exemplary embodiments of the various figures, it is to be understood that other similar embodiments may be used or modifications and additions may be made to the described embodiment for performing the same function without deviating there from. Therefore, the present invention should not be limited to any single embodiment.

The invention claimed is:

1. A benchtop apparatus comprising:
a circular saw blade;
a sliding table configured to slide along a side of the circular saw blade, wherein the sliding table comprises a plurality of openings; and
a removable fence configured to attach to and detach from the sliding table via a subset of the plurality of openings, wherein the removable fence comprises:
a locking peg coupled to a housing of the removable fence and configured to mate with at least one of the plurality of openings, the locking peg vertically extending away from a bottom portion of the housing and comprising at least one protrusion parallel to the bottom portion of the housing, wherein the locking peg is configured to twist so as to rotate the at least one protrusion between a locked position and an unlocked position, the locked position facilitating affixing the removable fence onto the sliding table, the unlocked position facilitating removing the removable fence from the sliding table;
a movable wall configured to maintain a parallel orientation with a housing of the removable fence and a perpendicular orientation with the sliding table; and
an adjustment knob configured to push the movable wall away from the housing when the adjustment knob is twisted in a first direction, and configured to pull the movable wall towards the housing when the adjustment knob is twisted in an opposite direction of the first direction.

2. The benchtop apparatus of claim 1, wherein the plurality of openings comprise a plurality of stabilizing holes and a plurality of locking holes, the plurality of stabilizing holes configured to stabilize the removable fence onto the sliding table, and the plurality of locking holes configured to lock the removable fence onto the sliding table.

3. The benchtop apparatus of claim 2, wherein a subset of the plurality of stabilizing holes and the plurality of locking holes are evenly spaced on the sliding table in a vertical configuration, and wherein the subset facilitates a coupling of the removable fence onto the sliding table at variable distances away from an edge of the sliding table.

4. The benchtop apparatus of claim 2, wherein a subset of the plurality of stabilizing holes and the plurality of locking holes are spaced on the sliding table in an angular configuration, and wherein the subset facilitates a coupling of the removable fence onto the sliding table at variable angles from an edge of the sliding table.

5. The benchtop apparatus of claim 1, wherein the adjustment knob is configured to facilitate maintaining the parallel orientation between the side portion of the housing and the movable wall via a plurality of arms.

6. The benchtop apparatus of claim 1, further comprising a lever coupled to the locking peg, wherein the lever is configured to rotate the at least one protrusion between the locked position and the unlocked position.

7. The benchtop apparatus of claim 6, further comprising a spring coupled to the lever and configured to provide resistance when the lever is pressed, wherein the at least one protrusion begins transitioning to the unlocked position when the lever is pressed, and wherein the at least one protrusion retracts into the locked position when the lever is released.

8. The benchtop apparatus of claim 1, wherein the locking peg is configured to mate with the at least one of the plurality of openings via an alignment of the at least one protrusion in the unlocked position with a corresponding shape of the at least one of the plurality of openings.

9. The benchtop apparatus of claim 8, wherein the at least one protrusion is configured to rotate while the locking peg is inserted into the at least one of the plurality of openings, and wherein the locked position is facilitated by a dealignment of the at least one protrusion with the corresponding shape of the at least one of the plurality of openings.

* * * * *